United States Patent
Miquel et al.

(10) Patent No.: US 7,043,203 B2
(45) Date of Patent: May 9, 2006

(54) PROCESS FOR RE-TRANSMITTING SINGLE FREQUENCY SIGNALS AND A SINGLE FREQUENCY SIGNAL REPEATER

(75) Inventors: Xavier Barba Miquel, La Garriga (ES); Domènec Iborra Archs, La Garriga (ES); Pedro Mier Albert, La Garriga (ES); Maria Meritxell Lamarca Orozco, Barcelona (ES); Montserrat Nájar Marton, Cornella de Llobregat (ES); Ana Isabel Pérez Neira, Primià de Dalt (ES); Gregori Vázquez Grau, Barcelona (ES)

(73) Assignee: Mier Comunicaciones, S.A., La Garriga (Barcelona) (ES)

( * ) Notice: Subject to any disclaimer, the term of this patent is extended or adjusted under 35 U.S.C. 154(b) by 371 days.

(21) Appl. No.: 10/203,940

(22) PCT Filed: Feb. 8, 2001

(86) PCT No.: PCT/ES01/00035

§ 371 (c)(1),
(2), (4) Date: Aug. 16, 2002

(87) PCT Pub. No.: WO01/61885

PCT Pub. Date: Aug. 23, 2001

(65) Prior Publication Data

US 2003/0022626 A1 Jan. 30, 2003

(30) Foreign Application Priority Data

Feb. 18, 2000 (ES) .............................. 200000379

(51) Int. Cl.
*H04B 7/14* (2006.01)

(52) U.S. Cl. .................. 455/24; 455/11.1; 455/15; 455/42; 455/62; 455/63.3; 455/75; 455/447; 375/211; 375/295; 375/317

(58) Field of Classification Search .................. 455/24, 455/11.1, 15, 19, 20, 7, 13.1, 23, 39, 42, 60, 455/62, 63.3, 71, 75, 447, 703; 375/211, 375/295, 316, 317
See application file for complete search history.

(56) References Cited

U.S. PATENT DOCUMENTS

| | | | | | |
|---|---|---|---|---|---|
| 4,301,432 A | * | 11/1981 | Carlson et al. | ............. | 333/164 |
| 4,406,016 A | * | 9/1983 | Abrams et al. | ................ | 455/19 |
| 4,789,993 A | * | 12/1988 | Ryu | ............................ | 375/214 |
| 6,025,799 A | * | 2/2000 | Ho et al. | ..................... | 342/374 |
| 6,141,539 A | * | 10/2000 | Marino | ........................ | 455/78 |

* cited by examiner

*Primary Examiner*—Edan Orgad
*Assistant Examiner*—Shaima Q. Aminzay
(74) *Attorney, Agent, or Firm*—Sughrue Mion, PLLC

(57) ABSTRACT

The invention discloses a process for re-transmitting single frequency signals and a single frequency signal repeater, where coupling occurs between the transmitting antenna and the receiving antenna, and where the process is of the type used in a single frequency signal repeater and comprises the steps of: [a] receiving a first radio frequency signal having a particular receiving power, [b] optionally converting said first radio frequency signal into a process signal, [c] filtering, amplification and automatically controlling the gain of said signal, [d] canceling said coupling between said transmitting antenna and said receiving antenna, [e] reconverting, as the case may be, said process signal into a second radio frequency signal, [f] amplifying the power of said second radio frequency signal, [g] output filtering, and [g] transmission.

22 Claims, 16 Drawing Sheets

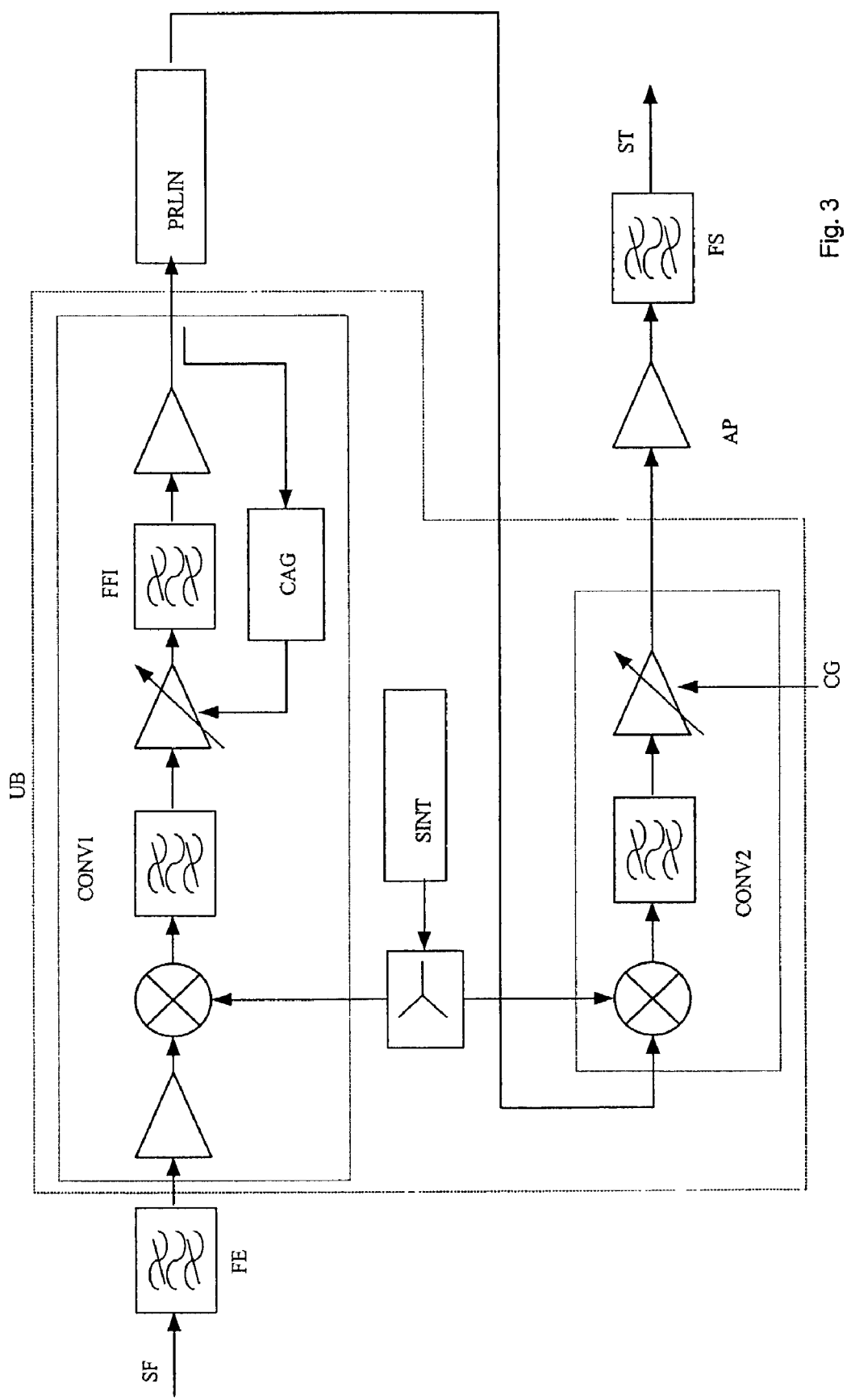

Table 1

| LUT address | | LUT value |
| --- | --- | --- |
| Control | Octet | |
| 0 | 000 | 0 |
| 0 | 001 | Coefficient |
| 0 | 010 | 2*Coefficient |
| 0 | 011 | 3*Coefficient |
| 0 | 100 | 4*Coefficient |
| 0 | 101 | 5*Coefficient |
| 0 | 110 | 6*Coefficient |
| 0 | 111 | 7*Coefficient |
| 1 | 000 | 0 |
| 1 | 001 | Coefficient |
| 1 | 010 | 2*Coefficient |
| 1 | 011 | 3*Coefficient |
| 1 | 100 | -4*Coefficient |
| 1 | 101 | -3*Coefficient |
| 1 | 110 | -2*Coefficient |
| 1 | 111 | -Coefficient |

PROCESS FOR RE-TRANSMITTING SINGLE FREQUENCY SIGNALS AND A SINGLE FREQUENCY SIGNAL REPEATER

BACKGROUND OF THE INVENTION

1. Field of the Invention

The invention relates to a process for re-transmitting single frequency signals, of the type used in a single frequency signal repeater and comprising the steps of: [a] receiving a first radio frequency signal through a receiving antenna, the first radio frequency signal having a receiving power, [b] optionally, converting the first radio frequency signal into a process signal, [c] filtering the signal, [d] amplifying the signal, [e] automatically controlling the signal gain, [f] reconversion, as the case may be, of the process signal into a second radio frequency signal, [g] amplifying the power of the second radio frequency signal, [h] output filtering the second radio frequency signal, and [i] transmitting the second radio frequency signal through a transmitting antenna, where coupling takes place between the transmitting antenna and the receiving antenna. The invention also relates to a single frequency signal repeater, of the type comprising: [a] a receiving antenna, for receiving a first radio frequency signal, having a receiving power, [b] a base unit, for converting, optionally, the first radio frequency signal into a process signal, filtering the signal, amplifying the signal, automatically controlling the signal gain, and reconverting, as the case may be, the process signal into a second radio frequency signal, [c] a power amplifier unit, [d] an output filter, and [e] a transmitting antenna, where the transmitting antenna and the receiving antenna may undergo coupling.

2. Related Art

The present invention relates, therefore, to signal processing, and the corresponding device therefor, the repeater, to be incorporated in DVB (Digital Video Broadcasting), DAB (Digital Audio Broadcasting), GSM, etc. repeaters that transmit in the same channel as they receive, whereby they operate in single frequency. This invention allows these repeaters to have high gains, so that for one same received signal level its transmitted power is increased and, consequently, its coverage area is increased. The ultimate aim of the system is to be able to cover the same area of service with a smaller number of repeaters, thereby reducing costs.

The main limitation of the repeaters that operate in single frequency resides in the fact that the reception and transmission frequency of the repeater is the same, whereby a certain degree of coupling exists between the transmitting and receiving antennas, that is to say, the receiving antenna receives an echo of the transmitted signal. This can cause the repeater to oscillate. Also, said coupling distorts the signal frequency. In accordance with the state of the art, an effective way of avoiding this, or of reducing it to insignificant values, is achieved by reducing the repeater's gain. However, a consequence of this is that the area of coverage thereof is also reduced.

An attempt has been made in the repeaters used so far to alleviate this problem by means of, for example, the use of reduced coupling transmitting and receiving antennas. However, this solution is expensive and not very satisfactory, since is not possible to avoid the coupling completely. By way of example, let us consider the case in which the transmitted signal is reflected from an object close to the repeater (a tree, a car, etc.). The echo caused by the reflection from said object will introduce a coupling between antennas not contemplated at the time of designing their radiation diagrams, whereby it will not be possible to avoid it.

SUMMARY OF THE INVENTION

It is an object of the invention to overcome these drawbacks. This object is achieved by means of a process for re-transmitting single frequency signals of the type first mentioned above, having a cancellation step of said coupling between said transmitting antenna and said receiving antenna. That is to say, conceptually, it is not a question of avoiding the formation of the coupling or echo, which is a solution that has shown itself to be expensive and of limited results, but rather the process is capable of "knowing" the coupling that is occurring, and cancels it. Since the received signal is really the sum of two components: one component is the "true" signal it is desired to transmit, and the other component is due to the coupling, the process according to the invention eliminates the component due to the coupling of the received signal before transmitting it. This allows a number of additional advantages to be attained. Thus, for example, the process allows "a priori" unforeseen couplings to be cancelled in a simple way, such as for example, those caused by the environment.

Preferably the first radio frequency signal is converted into a process signal, such as, for example, into an intermediate frequency (Fi) signal, into a baseband signal, etc., but it is also possible to have the whole process carried out on the first radio frequency signal, without any conversion.

An additional improvement consists of carrying out an adaptive process that permanently estimates the coupling between antennas, even while the repeater is operative. This allows the cancellation of time-variable coupling, such as may be generated by mobile elements in the environment.

Preferably the cancellation step comprises a negative feedback. Since the received signal is really the sum of two components, such as has already been stated above, by means of the negative feedback, a signal equal (or very similar) to the component due to the coupling is subtracted from the received signal. Thus, the signal that is transmitted is free from the component due to the coupling.

The proposed process is more agile and cheaper than the existing ones, thanks to its implementation not requiring any alteration of the radiation diagrams between antennas, but a simple filtering of the transmitted signal that is easily reconfigurable and the cost of which is low.

Also the present invention proposes a single frequency signal repeater of the type first mentioned above, wherein it includes a device adapted to cancel said coupling between said transmitting antenna and said receiving antenna.

Other advantages and features of the invention will be appreciated from the following description, wherein, without any limitative character, preferred embodiments of the invention are related, with reference to the accompanying drawings, in which:

BRIEF DESCRIPTION OF THE DRAWINGS

FIG. 3 is a block diagram of an example a conventional single frequency signal repeater.

Table 1 shows the contents of the Look-up Table (LUT).

DETAILED DESCRIPTION OF THE INVENTION

Figure 1:
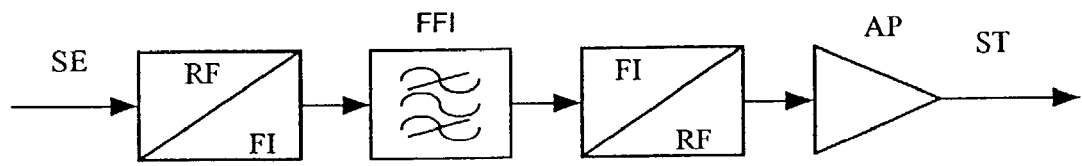
FIG. 1 is a generic block diagram of a conventional single frequency signal repeater.

FIG. 1 shows a generic block diagram of a single frequency signal repeater. In accordance with this diagram, the incoming radio frequency (RF) signal SE (received by the receiving antenna), is converted into an intermediate frequency (Fl) signal, and an intermediate frequency pass band filter FFI filters other undesired signals received. Subsequently a converter converts the intermediate frequency signal back into a radio frequency signal again, in the same channel as the received radio frequency signal. Finally the signal is amplified to the required output level by means of an output power amplifier AP and is transmitted ST.

Figure 2:
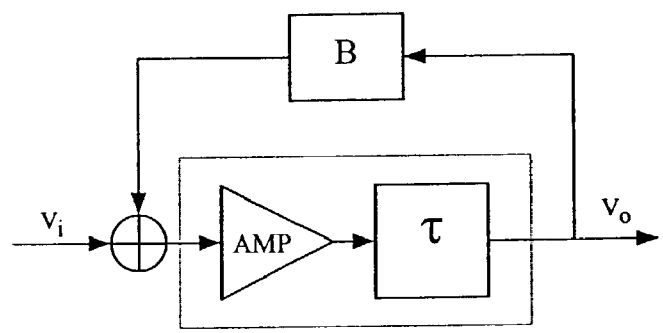
FIG. 2 is a simplified model of a conventional single frequency signal repeater.

A single frequency signal repeater is, substantially, a filtered amplifier, and can be modeled as shown in FIG. 2. Within the corresponding signal bandwidth, the repeater acts as an amplifier AMP, followed by a delay cell, of value $\tau$.

This delay is due to the intermediate frequency pass band filter FFI. The receiving and transmitting antennas are not perfectly insulated from one another, whereby coupling takes place between them, generating a feedback of the output signal in the input signal. Said coupling effect can be modeled as a feedback line of gain B, as shown in FIG. 2. Additionally, this coupling line also has a delay, but this delay is much smaller than the delay $\tau$, whereby it can be ignored.

The system transfer function is:

$$\frac{V_o}{V_i} = H(\varpi) = \frac{Ae^{-j\varpi\tau}}{1 - ABe^{-j\varpi\tau}}$$

The amplitude response is not flat, but rather rippled, depending on the product AB, the expression of which is:

$$\text{Amplitude ripple } (dBpp) = 20\log\frac{1+AB}{1-AB}$$

Another form of expressing the product AB is as the gain margin, which may be defined as the difference between the antenna insulation and the repeater gain:

$$\text{Gain margin (dB)} = -20 \log(AB)$$

The key point in the operation of a single frequency signal repeater is the compromise between a minimum gain margin, allowing a maximum gain to be achieved, and, therefore, the maximum output power, and the maximum authorized amplitude ripple.

FIG. 3 is a block diagram of an example of a conventional single frequency signal repeater. It comprises a base unit UB, a power amplifier unit AP and an output filter unit FS.

The base unit UB carries out the following functions:
a) conversion of a first radio frequency signal into an intermediate frequency signal;
b) filtering the intermediate frequency signal;
c) amplification;
d) automatic gain control;
e) conversion of the intermediate frequency signal into a second radio frequency signal;

The power amplifier unit AP amplifies the power.

The output filter FS carries out a final filtering of the signal to eliminate undesired out-of-band signals.

The base unit UB consists of the following components:
1. an input filter FE which eliminates the undesired signals received out-of-band;
2. a first converter CONV1 comprising, in turn, a means for converting the radio frequency channel received into an intermediate frequency, an intermediate frequency filter FFI, and the automatic gain control CAG;
3. a linearity pre-corrector PRLIN, which is a circuit compensating for the intrinsically non-linear behavior of the amplifier unit;
4. a second converter CONV2 including a means for converting intermediate frequency to the radio frequency output channel and the output level control circuit;
5. a synthesizer SINT generating and supplying the signal from the local oscillator to both frequency converters.

Figure 4:
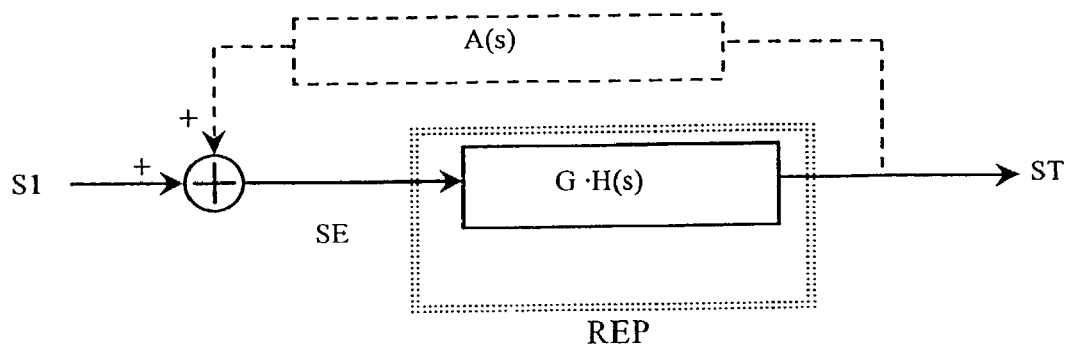
FIG. 4 illustrates a simplified model of a conventional single frequency signal repeater, with the transfer function expressed in complex variable.
Figure 5:
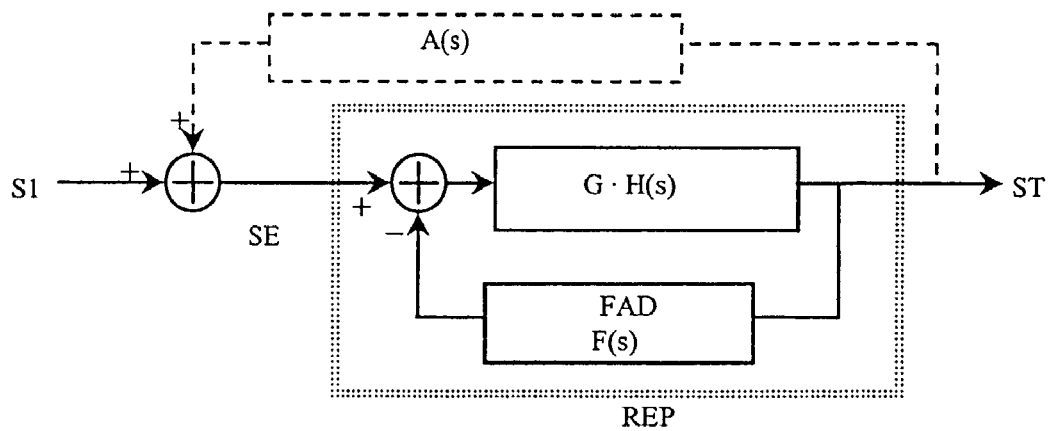
FIG. 5 illustrates a simplified model of a single frequency signal repeater according to the invention.

FIGS. 4 and 5 illustrate the basic differences between the already existing single frequency repeaters and the proposed invention, where the notation (s) refers to the representation of the linear systems by means of their transfer function in terms of the complex variable s. FIG. 4 illustrates the basic block diagram of a conventional single frequency signal repeater, where the repeater's main chain receives an input signal SE and transmits an output signal ST. The main chain has been modeled with a response H(s), and a gain G. The coupling between antennas has also been ndicated in dash line, modeled linearly by means of a response A(s). It is thus observed that the signal SE entering the repeater REP through the receiving antenna is the sum of the desired received signal S1 plus a coupling signal. In a conventional repeater, the stability of the repeater depends on the loop gain G·H(s)·A(s), and the only way to guarantee that it is stable is to reduce the gain G or to reduce the coupling A(s). FIG. 5 illustrates the block diagram of a repeater incorporating one embodiment of the proposed invention. It consists of a negative feedback of the transmitted signal ST that is processed by means of the adaptive filter FAD, expressed as complex variable as F(s), and subsequently it cancels the echoes, that is to say the coupling, at the repeater input. It is evident that now the repeater's stability depends on the loop gain G·H(s)·(A(s)−F(s)), whereby to guarantee it, it is sufficient to achieve F(s)=A(s), without necessity of reducing G or A(s).

The proposed process is to some extent similar to the echo cancellation systems used in communications over long distance telephone lines. Nevertheless, the objectives are different. Indeed, the objective of the proposed invention is to allow a repeater having a large gain at the same time as it stays stable to be implemented and, for example in the case of a DVB signal, the dispersion with time of the transmitted signal ST is sensibly inferior to the duration of the cyclic prefix. On the other hand, in the echo cancellation system used in communications over long distance telephone lines, there is no problem of instability, and the desired objective is to eliminate from the received signal the component of transmitted signal introduced by the hybrid in the passage from 2 wires to 4 wires. Also, there are notable differences in the problems originated in the implementation of both applications.

The description of the invention requires the specification of the following aspects of its implementation: A) architecture for inserting the adaptive processing in the single frequency signal repeater, B) architecture for implementing the filter for the processing of the signal, C) algorithm for estimating the filter coefficients.

There is described hereinafter in detail one possible configuration of the proposed invention, implemented totally with analog technology. This is referred to hereinafter as analog configuration. Subsequently there are briefly described some digital alternatives for the implementation thereof, referred to as digital configurations that are distinguished from the analog configuration in that they implement the adaptive filter digitally, but their principles are common to the latter, whereby they should be considered to be parts of the same invention.

Analog Configuration

Figure 6:
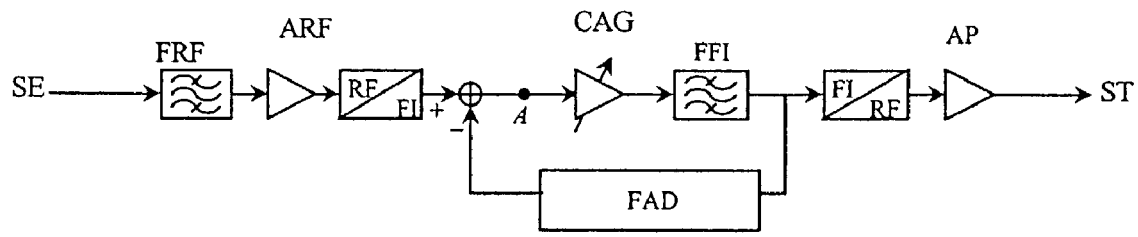
FIG. 6 is a block diagram of a single frequency signal repeater according to the invention.

The block diagram of FIG. 6 describes with more detail one embodiment of a repeater according to the invention, showing in a summarized way all the repeater steps that are relevant to the invention.

In the repeater of FIG. 6, the coupling has been modeled linearly and the repeater has an adaptive filter FAD which estimates the value of the coupling in the frequency band occupied by the signal and cancels its contribution to the transmitted signal ST, so that the repeater behaves as if it did not exist. Preferably the proposed repeater works in intermediate frequency (FI). However other alternatives may also be used operating in baseband or in other frequencies such as is commented upon in the digital configurations section. The repeater of FIG. 6 is provided, additionally, with a radio frequency filter FRF, and a radio frequency amplifier ARF at the input end of the equipment.

The adaptive filter FAD takes the main chain signal after the CAG (Automatic Gain Control). This detail is important with a view to establishing the performance of the system, since in this case the variations with time of the filter coefficients are due only to the variation of the coupling between antennas, but not to variations in the repeater gain. Nevertheless, it is also possible to arrange for the adaptive filter FAD to take the signal before the CAG.

Figure 7:
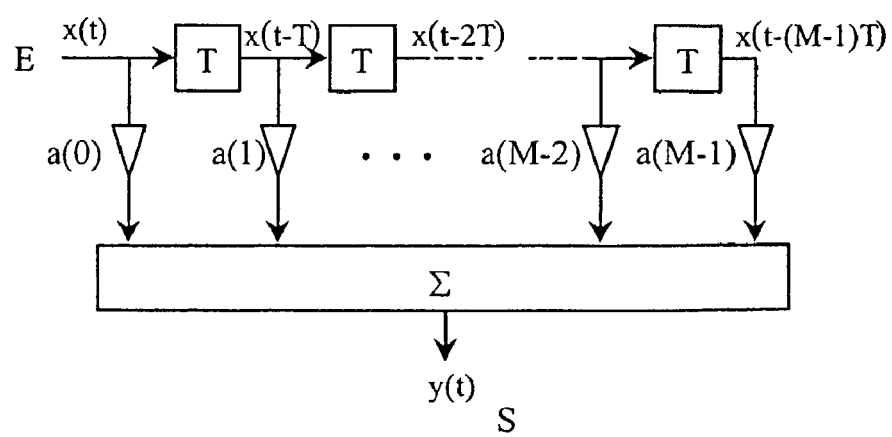
FIG. 7 is a block diagram of an analog delay line.

The adaptive filter FAD is implemented preferably by means of an analog delay line and multipliers that weight and add the signal to the output of each of the delay cells T (FIG. 7). The number of cells and multipliers depends on the compromise established between the complexity of the system and the level of cancellation of the couplings that it is desired to achieve. On the other hand, the delay introduced by each cell T should be chosen in agreement with the value of the intermediate frequency and the band width of the signal. Indeed, the implemented filter has a periodic frequency response, whereby it is necessary to introduce certain restrictions in the delay with the purpose of guaranteeing that there is freedom to cancel the coupling between antennas in the whole frequency band occupied by the signal.

The filter coefficients are preferably constantly adaptively estimated while the repeater is in operation. This is because the coupling between antennas is unknown a priori, since it depends on the configuration of the main chain (antennas, filters and amplifiers used) and of the environment where the repeater is located (nearby obstacles, reflectivity and distance of the latter, etc.). Also, it is not very effective to estimate their value a priori since the environment can change with time (movement of the foliage of nearby trees, movement of cars or people, etc.).

One embodiment of the proposed invention estimates the filter coefficients based on the optimization of a quadratic cost function: minimization of the signal power at point A of FIG. 6. This criterion is based on the statistical property of non-correlation between the desired received signal and the signal induced in the antenna by the coupling, thanks to which it is shown that the power at point A is minimum when it has been possible to cancel said coupling. In order to guarantee correct operation of the criterion, it should be ensured that the main chain introduces a delay equal to or longer than the minimum for which the desired non-correlation is fulfilled. Optionally this non-correlation delay can be introduced in the conversion step.

The minimization of the power in the point A is equivalent to a criterion of minimum mean squared error that can be optimized with very diverse adaptive algorithms. The fact that an analog implementation is used has made it advisable to limit the algorithms applied to the simplest and whose behavior is well documented in the literature. Preferably the Least Mean Square (LMS) and normalized LMS (NLMS) algorithms can be used, as well as the simplified versions thereof based on the sign function (see Ref. [2], [6], [8], [11]). Nevertheless, the algorithm used is not the object of this invention, and any algorithm the convergence and good behavior in follow-up of which is guaranteed (see other alternative algorithms in the digital configurations section) could be used.

The adaptive filter FAD is faced with two basic restrictions. The first restriction is the need to guarantee a minimum delay in the main chain, as previously mentioned. This delay can be introduced in said conversion step. The second restriction resides in the fact that the coupling can cause a signal of a level substantially lower than the desired signal in the receiving antenna (otherwise the repeater would start to oscillate), whereby the signal to noise ratio (SNR) for the purpose of identification of the coupling is very low. This requires that a very slow evolution of the adaptive system coefficients be forced with the objective of compensating the loss of SNR with a time averaging of the signal.

Figure 8:
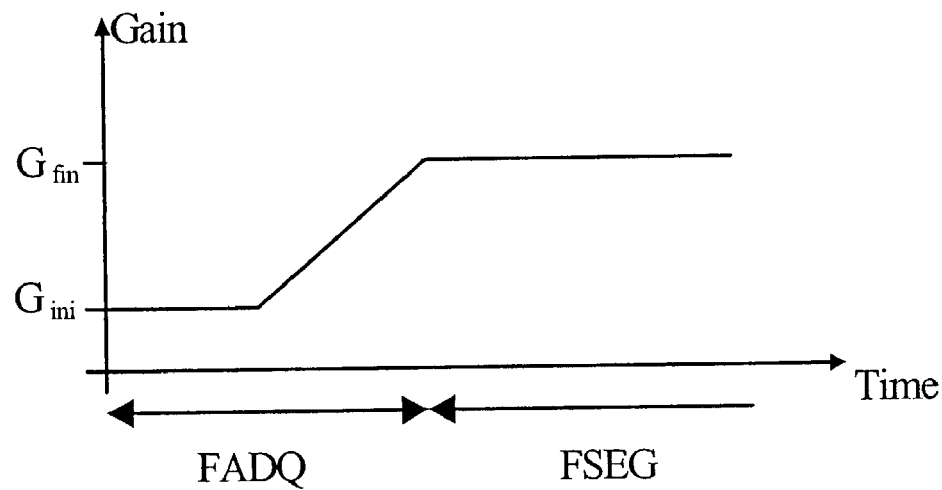
FIG. 8 illustrates a time graph showing the variation of the repeater's gain during the acquisition and follow-up phases.

FIG. 5 illustrates the closed loop structure of the single frequency repeater REP, the coupling between antennas and the adaptive filter FAD. This structure causes the cancellation errors to be fed back to the system and to the transmitted signal, with the possibility of causing the system to start oscillating—it is recalled that the stability depends on the loop gain $G \cdot H(s) \cdot (A(s) - F(s))$—. To avoid this, it is advisable to contemplate mechanisms that assure that the system stays stable at all times. This drawback, which does not appear in the echo cancellation systems used in communications over long distance telephone lines, makes it advisable to establish two phases in the operation of the proposed invention: the acquisition phase FADQ and that of follow-up FSEG (FIG. 8). The acquisition phase FADQ is carried out only once, during the initialization or start up of the repeater. During this phase, the repeater gain stays low ($G_{int}$), so that it is stable independently of the cancellation level reached by the adaptive system. In it, the adaptive algorithm estimates the value of the optimal coefficients of the adaptive filter and reduces the coupling to levels below the desired one. The gain stays at low level for sufficient time to allow the convergence of the algorithm and, subsequently, is increased slowly until it reaches its regular value ($G_{fin}$). In the follow-up phase FSEG the repeater operates normally, having attained the desired gain and cancellation levels. Nevertheless, the adaptation algorithm of the adaptive filter remains in operation to detect and to follow possible variations of the frequency response of the coupling between antennas without having to reinitiate the repeater. These changes in gain in the acquisition phase are operated preferably in the intermediate frequency amplifiers AFI.

The analog configuration of the invention has two basic limitations. In the first place, the limitations in complexity imposed by the very fact of being analog, either in the number of coefficients of the adaptive filter, in the type of adaptive filter or even in the adaptive algorithm used. In the second place, the technological problems attached to the implementation of the adaptive algorithm, such as for example the offset of the integrators used in LMS, although alternatives can be found that alleviate the seriousness of this problem (see [2]). Nevertheless, a preferred solution to both problems is to use, at least in part, digital technology, whereby the alternatives that the digital configuration of the proposed invention offers are described below.

Digital Configurations

Diverse alternative digital implementations to the basic analog configuration described can be devised. They are all based on the same principles that constitute the basis of the proposed invention. However, they are distinguished from the basic configuration in that the adaptive filter operates on the digitized signal, whereby it has the degrees of freedom offered by the digital processing of the signal as well as the drawbacks that the introduction of sampling and reconstruction steps of the analog signal represent.

Architecture

The digital implementation of the adaptive filter requires the digitization of the signals involved in the filtering and filter coefficient estimation processes. Four alternative architectures are contemplated, according to at what point of the main chain the signals are sampled and reconstructed. These four options are shown in FIGS. 9–12.

Figure 9:
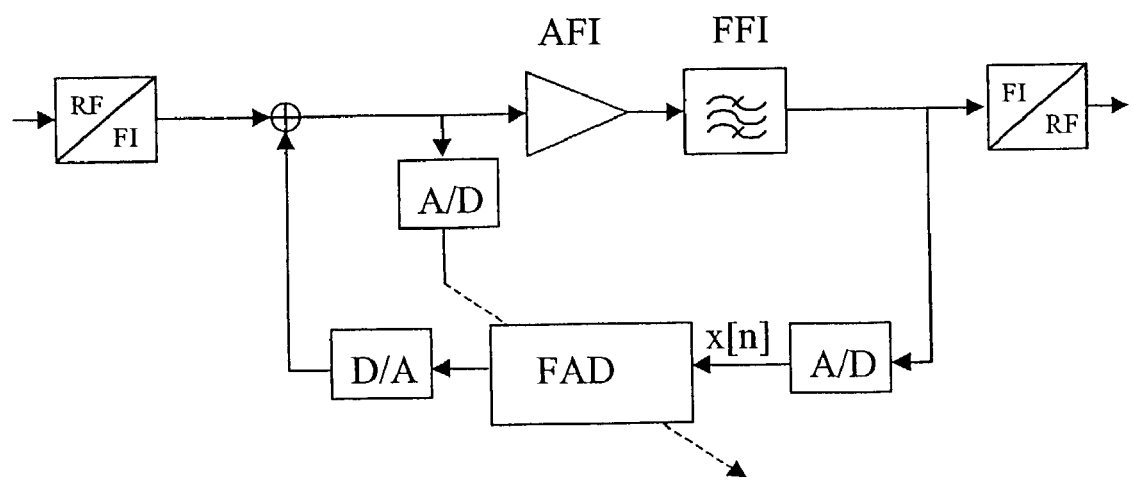
FIG. 9 illustrates a first alternative strategy for sampling the signal used in the estimate of the filter response.
Figure 10:
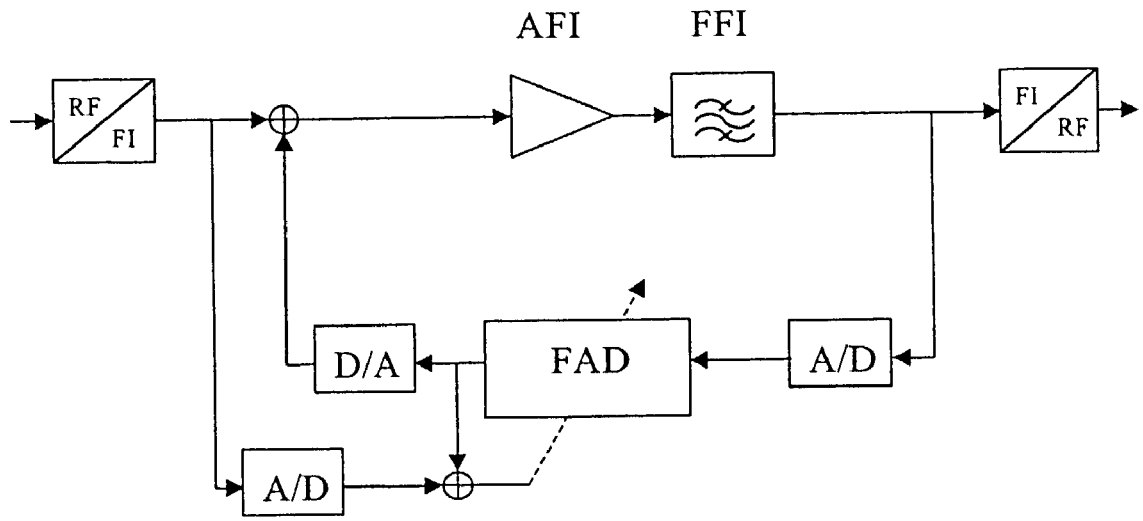
FIG. 10 illustrates a second alternative strategy for sampling the signal used in the estimate of the filter response.
Figure 11:
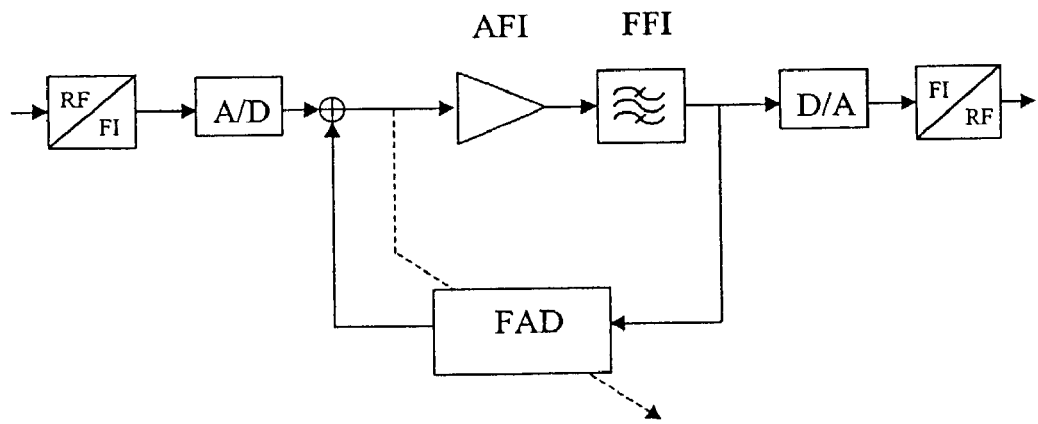
FIG. 11 illustrates a repeater with the whole intermediate frequency step implemented digitally.
Figure 12:
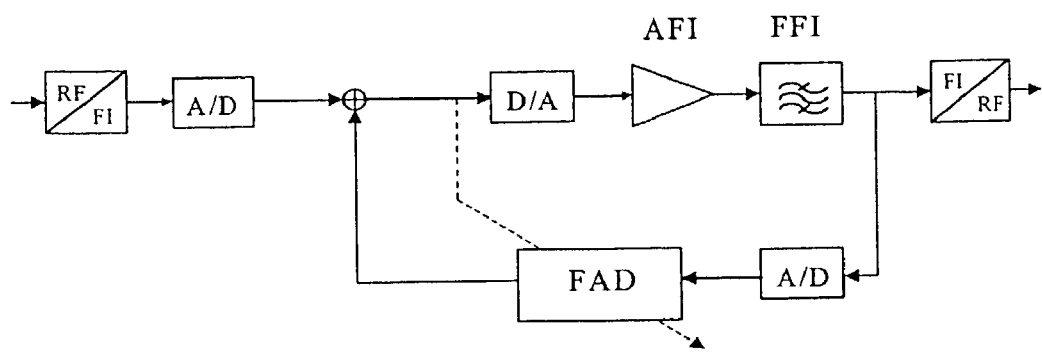
FIG. 12 illustrates a third alternative strategy for sampling the signal used in the estimate of the filter response.

FIGS. 9, 10 and 12 correspond to different strategies for sampling the signal used in estimating the adaptive filter FAD response, while FIG. 11 illustrates the case in which it is opted to implement the whole FI (intermediate frequency) step of the repeater digitally. In this case, the signal can be regenerated (demodulation and modulation), substantially improving the repeater's performance. In all cases, the signals can be sampled in baseband (called I/Q sampling), so that the analytical signal is recovered, or in the pass band signal (called FI sampling), either in the FI signal or transferred to another lower frequency that is more convenient from the sampling point of view. It should be borne in mind that the sampling alternatives commented upon below (generation of the analytical signal, heterodynation) are also applicable to the analog implementation described as basic configuration, although the technological complexity of the implementation thereof dissuades its use. The application of one or another sampling type to each of the A/D converters gives place to four possible configurations that differ from each other in that they work with real or complex coefficients and/or error signal. Although the four combinations lead to similar solutions and cancellation levels, all of them require a different design of the sampling frequency and of the number of coefficients of the adaptive filter, although said design is always based on the principles already expressed for the analog configuration. Generally speaking, the adaptive algorithms afford a quicker convergence in those configurations that work with complex coefficients, but this improvement is offset by a greater technological complexity of the implementation of the A/D and D/A conversion. In all cases, the election of the sampling frequency will depend on the same parameters as in the analog configuration already commented upon (value of the intermediate frequency adopted in the repeater and signal band width) as well as of the selectivity of the filters in the main chain.

Figure 13:
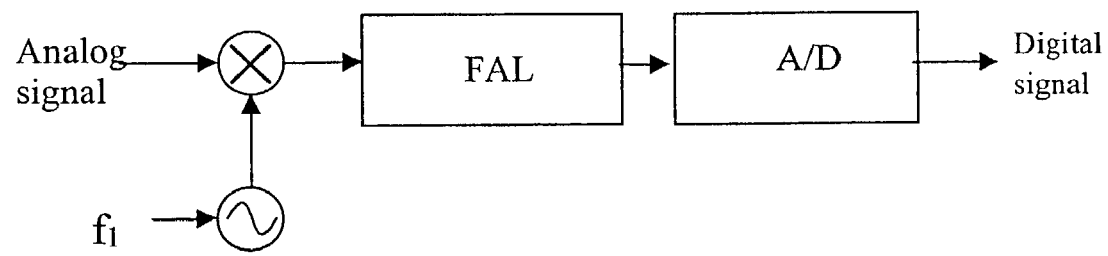
FIG. 13 illustrates a scheme of an analog/digital (A/D) conversion step.
Figure 14:
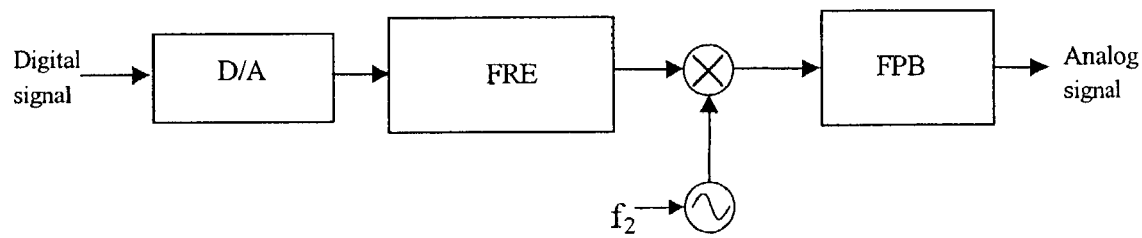
FIG. 14 illustrates a scheme of a digital/analog (D/A) conversion step.

The A/D and D/A conversion steps are implemented in a different way according to whether I/Q or FI sampling is elected. FIG. 13 illustrates a scheme for the A/D conversion step. The antialiasing filter FAL and the local oscillator ($f_1$) are necessary or unnecessary according to which sampling method is elected and how selective the filters of the main chain are. FIG. 14 illustrates a scheme for the D/A conversion step. The reconstruction filter FRE compensates for the part of the distortion introduced by the D/A converter that has not been corrected digitally. The application or otherwise of the local oscillator ($f_2$) depends on the sampling type and frequency used, while the pass band filter FPB is only necessary if heterodynation is applied with the local oscillator and the subsequent filters of the main chain are not sufficiently selective.

Finally, in all the previous architectures it might be desirable to aid the adaptive filter with a system compensating for possible distortions or phase jitters or frequency offsets ([4]). Although the adaptive filter can in theory compensate for said distortions, in practice, above all in multicarrier systems such as is DVB, it cannot adapt itself sufficiently quickly to follow said perturbations of the carrier.

Filter Implementation Architecture for Signal Processing.

The filter can be implemented by means of an in-line delay architecture or by means of a lattice network. On the other hand, a finite (FIR) or infinite (IIR) impulse response filter can be used. The IIR-filters provide a better performance for same number of coefficients, but have limitations in their combination with adaptive algorithms.

Figure 15:
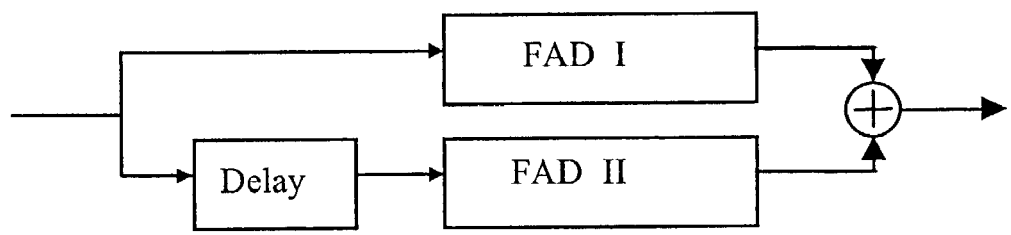
FIG. 15 illustrates an adaptive filter broken down into two blocks.

If the environment where the repeater is located causes very late echoes of the transmitted signal to appear in the receiving antenna (with a delay greatly in excess of the filter sampling period), is advisable to break the adaptive filter down into two blocks FAD I and FAD II (see FIG. 15), one of them, FAD I, operating with the transmitted signal and the other, FAD II, with the same signal delayed by a time interval similar to the appearance time of the late echoes.

The filtering process can be implemented in the time or frequency-domain. In the latter case, the use of the FFT or other filter banks with multirate structures allows the computational cost to be reduced and the convergence of the adaptive algorithm ([10], [5]) to be improved. Nevertheless, the frequency implementation of adaptive filters operating in environments where coupling between antennas is subject to variations with time limits the capacity of following said changes and, furthermore, always causes the introduction of a delay in the adaptive filter that can limit its coupling cancellation capacity.

Adaptive Algorithms for Estimating Filter Coefficients.

The adaptive filter coefficients can be estimated with any algorithm that guarantees convergence to the correct solution, that is to say, to the one in which the adaptive filter correctly estimates the coupling between antennas, and which, furthermore, is capable of following the variations with time thereof. From among said algorithms, the most common and studied are those which follow criteria: I) of minimum mean squared error or II) of least squares. Both criteria can be used both in delay line architecture and in lattice architecture.

There is given below a non-exhaustive list of the applicable algorithms, in attention to whether they are implemented with FIR or IIR response.

In the case of the FIR-filter ([3]), and taking criterion I), one possibility is to use the steepest descent family of algorithms, which, starting out from any initial value of the coefficients correct it with an increment in the opposite direction to that of the gradient which has the power surface depending on the coefficients. The gradient is calculated in an exact statistical way; for this reason, these algorithms need to have prior knowledge of the characteristics of the echoes or coupling to be cancelled and cannot properly be described as adaptive.

Where the echoes or coupling are unknown, one solution is to have recourse to the family of differential steepest descent algorithms which calculate the gradient starting from differences in the error function originated by perturbations which are caused in the coefficients. Nevertheless, these algorithms converge slowly and a quicker solution is to use the stochastic gradient, that is to say, to use an instantaneous calculation of the exact expression of the gradient. Where the error function to be minimized depends linearly on the coefficients, said algorithms are included in the so-called LMS (Least Mean Square) algorithm and variants such as the NLMS (Normalized LMS), the P vector algorithm or other variants that have scenarios in which that the interfering noise is not distributed in an uniform or white way in frequency, but rather do it in a colored way. Where the error function to be minimized depends non-linearly on the filter coefficients or depends recursively thereon, the stochastic gradient algorithms calculate the gradient with a small number of iterative applications of the rule of the differential calculus chain. Where the error function does not depend linearly on the coefficients, said algorithm is a non-linear extension of the LMS called the back propagation algorithm ([1]). In the case to which this patent relates, the gradient of the error depending on the filter coefficients must be derived from the rule of the chain. In FIG. 6 the error signal at the output of the adaptive filter is shown to be the one that, properly amplified, is transmitted by the repeater. Therefore, it is the error signal that will be coupled with the desired received signal at the input to the receiving antenna and it will become part of the error signal again. Therefore, the LMS algorithm is an approximation of the gradient that allows the calculation to be reduced regarding the rule of the chain, which is the one that should really be applied. Only if the intermediate frequency filter FFI, shown in FIG. 6, introduces an appropriate delay, will the transmitted signal be incorrelated with the error signal and the LMS will make an increasingly valid approximation of the gradient.

In the case of the FIR-filter, and considering criterion II), the most feasible and effective algorithm is the Kalman filter or variants thereof: RLS or Recursive Least Squares and the rapid Kalman filter.

In the case of IIR-filters, implementation by means of lattice network is preferable to the delay line, since it allows the stability of the adaptive filter to be easily monitored during the convergence phase. The filter coefficients can be estimated by means of steepest descent algorithms, algorithms based on the methodology of Steiglitz-McBride or on hyperstable algorithms ([12], [7]). The first group is based on the minimum mean squared error criterion, based either on the output error or on the equation error. It is preferred to minimize the output error (e.g. using the RPE or Recursive Prediction Error algorithm [9], since the cost function based on the equation error does not guarantee convergence to the optimal solution under conditions of a low signal to noise ratio, as is the case of the proposed invention. Among the algorithms of the third group there is the very well known SHARF or Simplified Hyperstable Adaptive Recursive Filter, having the qualities desired in an adaptive algorithm.

Finally, it must be borne in mind that if it is opted to implement the whole FI step of the repeater digitally (FIG. 11), complete digital processing of the received signal can be carried out, that regenerates it by means of demodulation and subsequent modulation. In this case, advantage can be taken of the training sequences proper to the signals retransmitted, if there were any, such as for example the pilot tones of the DVB signal, which can be taken as a reference when calculating the error function that will govern any of the described algorithms. The advantage of taking the training sequences as a reference is that they allow the adaptive algorithm to work under better SNR conditions, as well as facilitating the use of different architectures for inserting the adaptive system in the single frequency signal repeater.

Example of Analog Embodiment

Introduction

Figure 16:
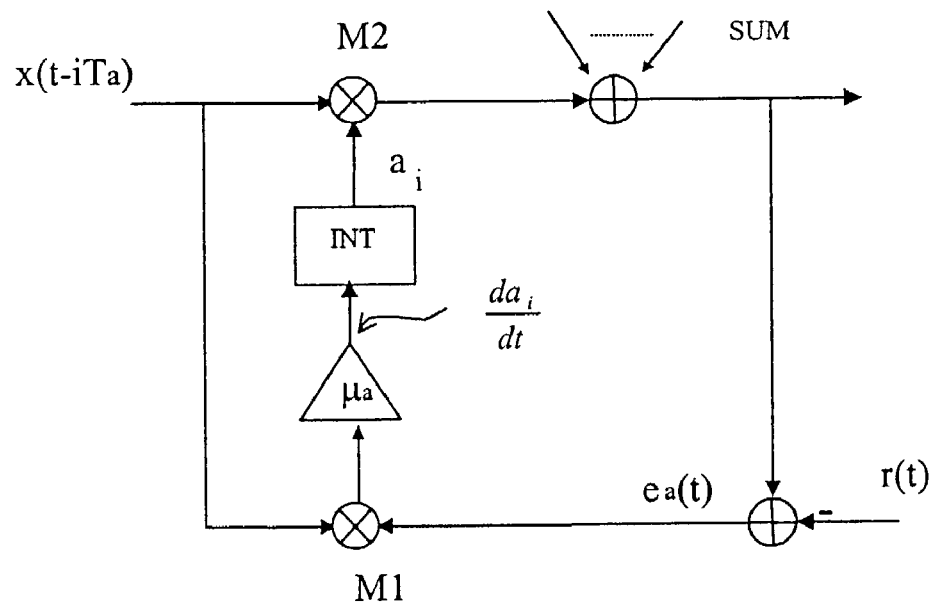
FIG. 16 illustrates a block diagram of the analog implementation of the calculation of coefficients according to the LMS algorithm.

There is described one example of an analog embodiment of a DVB signal repeater, which is based on a finite impulse response adaptive FIR-filter of a structure according to the one shown in FIG. 7, composed of a delay line. As illustrated in FIG. 7, the input signal E of the adaptive filter is injected into the delay line. Subsequently, the signals present at the output of each delay are multiplied by their respective coefficients, and finally the results of such multiplications are added to obtain the output signal S of the adaptive filter. In this embodiment, the obtaining of the value of the coefficients is based on the LMS or Least Mean Squares algorithm. FIG. 16 illustrates the implementation by means of a correlation loop of the calculation of coefficients according to the LMS algorithm. Said algorithm calculates each of the coefficients according to the following expression:

$$a(t) = \mu_a \int_{-\infty}^{t} x(\lambda)e_a(\lambda)d\lambda = a(0) + \mu_a \int_{0}^{t} x(\lambda)e_a(\lambda)d\lambda$$

where the signal x(t) is the delay output signal, the signal r(t) is the signal present in the receiving antenna, $e_a(t)$ is the error signal after the cancellation, and a(t) is the ensemble of coefficients. $\mu_a$ is the adaptation constant, which fixes the speed of convergence of the algorithm, as well as the magnitude of the oscillation of the coefficients relative to the final solution. The elements M1 and M2 are multipliers, the element INT is the integrator and the element SUM is the adder of the signals multiplied by the respective coefficients.

Approach to the Embodiment

The single frequency or isofrequency repeaters usually have intermediate frequency processing, which allows high selectivity filters to be used.

The adaptive filter can be embodied at the same intermediate frequency as that of the repeater, or at a second lower intermediate frequency, should the possible advantages of operating at a lower frequency compensate for the increment in complexity on having to add a converter from the first to the second intermediate frequency before the adaptive filter, and another converter from the second to the first intermediate frequency, at the output from said filter. The block diagram of the implementation example in question is the one illustrated in FIG. 6.

Blocks Used

Figure 17:
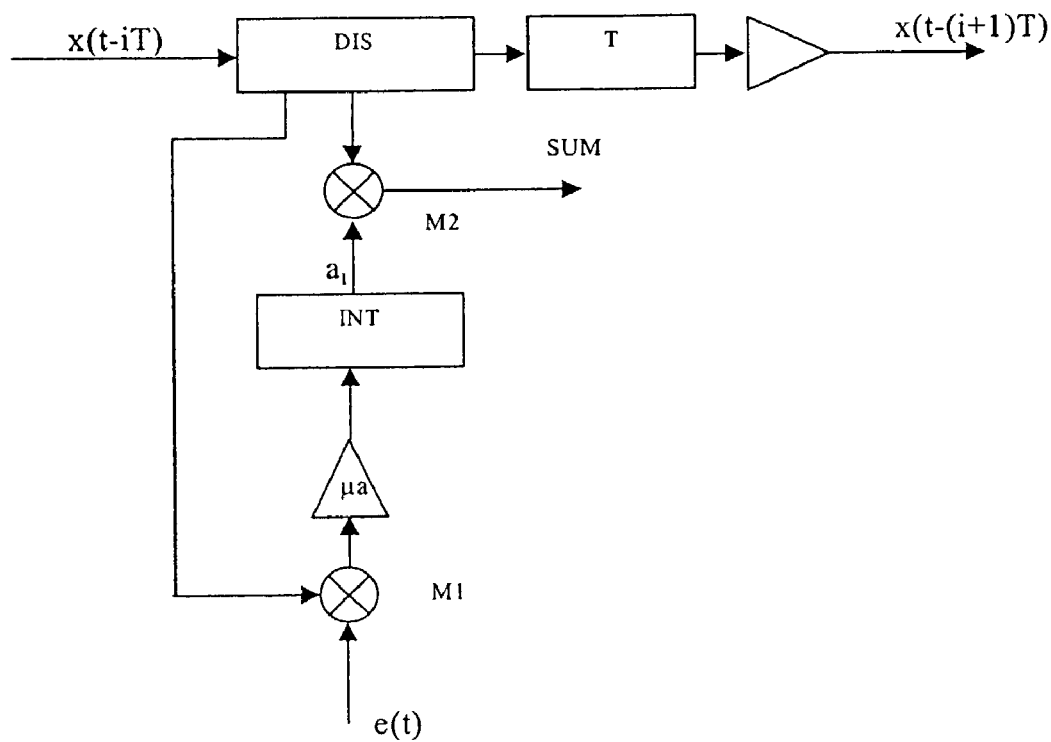
FIG. 17 illustrates an analog embodiment of the correlation loop for obtaining the coefficients.

The group of basic blocks that compose the adaptive filter in its analog embodiment is as follows:
Delay blocks
Multipliers
Integrators
Distributors and combiners
Signal amplifiers
Adder FIG. 17 illustrates the block diagram of one of the cells where a signal x(t−iT) is seen to be input, a distributor DIS distributes it, on one hand, to a delay T to obtain an output x(t−(i+1)T), on the other hand, to a multiplier M2, and, again, to a multiplier M1. The multiplier M1 also receives the error signal e(t).

Figure 18:
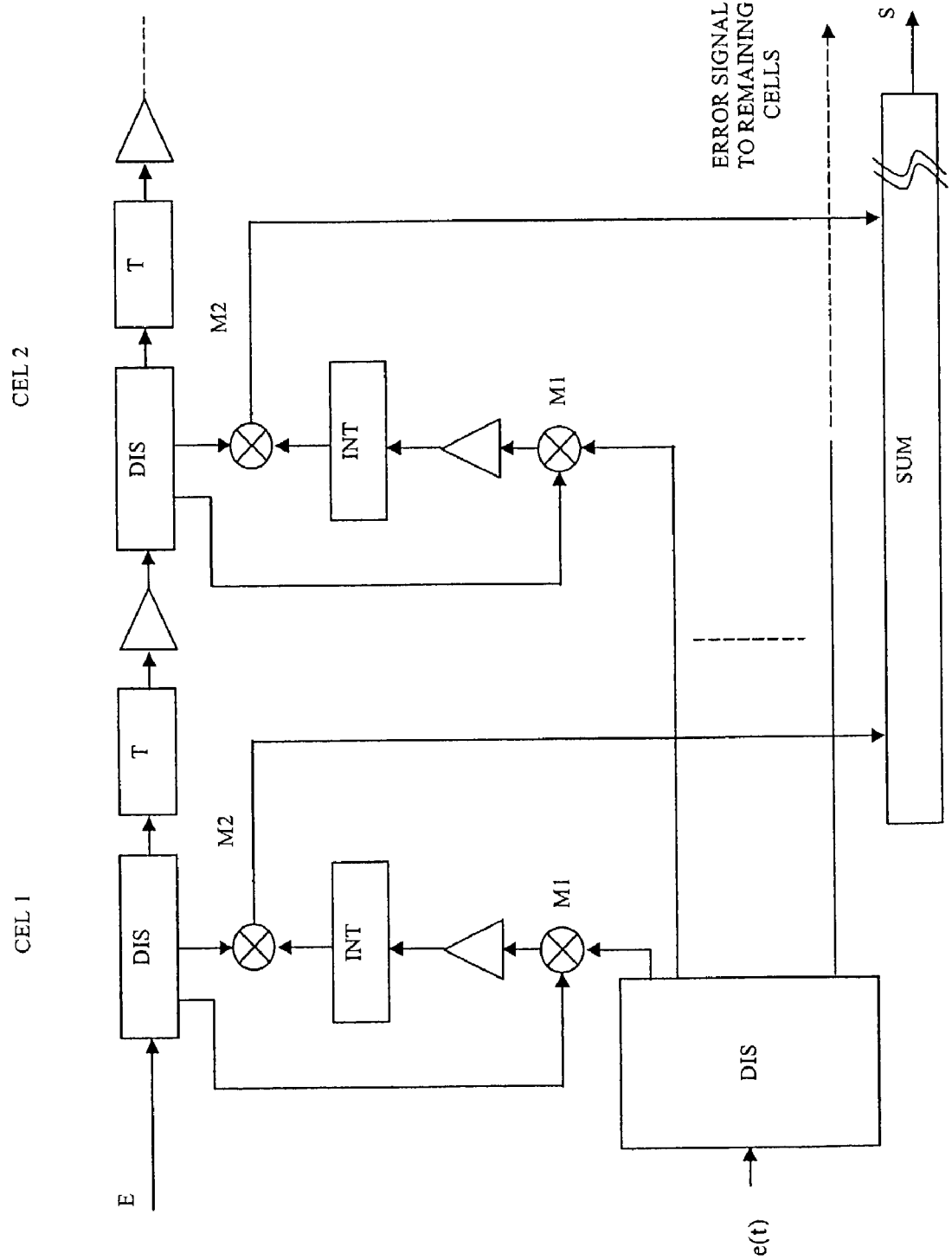
FIG. 18 illustrates a two-cell portion equivalent to that of FIG. 17 of the analog embodiment of the adaptive filter.

FIG. 18 illustrates a stretch of two cells, CEL1 and CEL2, of the analog embodiment of the adaptive filter.

Embodiment of Each Block
Delay Blocks

The delay blocks can be embodied by means of the following techniques:
Surface acoustic wave (SAW) delay lines
Resonator circuits, for example LC, ceramic or dielectric.
Pass band filters with sufficiently flat group delay
Transmission lines, for example coax lines, microstrip or stripline.
Multipliers The multipliers can be embodied by means of the following techniques:
Multiplier circuits, for example four quadrants.
Variable gain amplifiers.
Attenuators with electronic control, for example based on PIN diodes.
Integrators The integrators can be embodied by means of the following techniques:
By means of operational amplifiers
By means of first order low pass filters.

Figure 19:
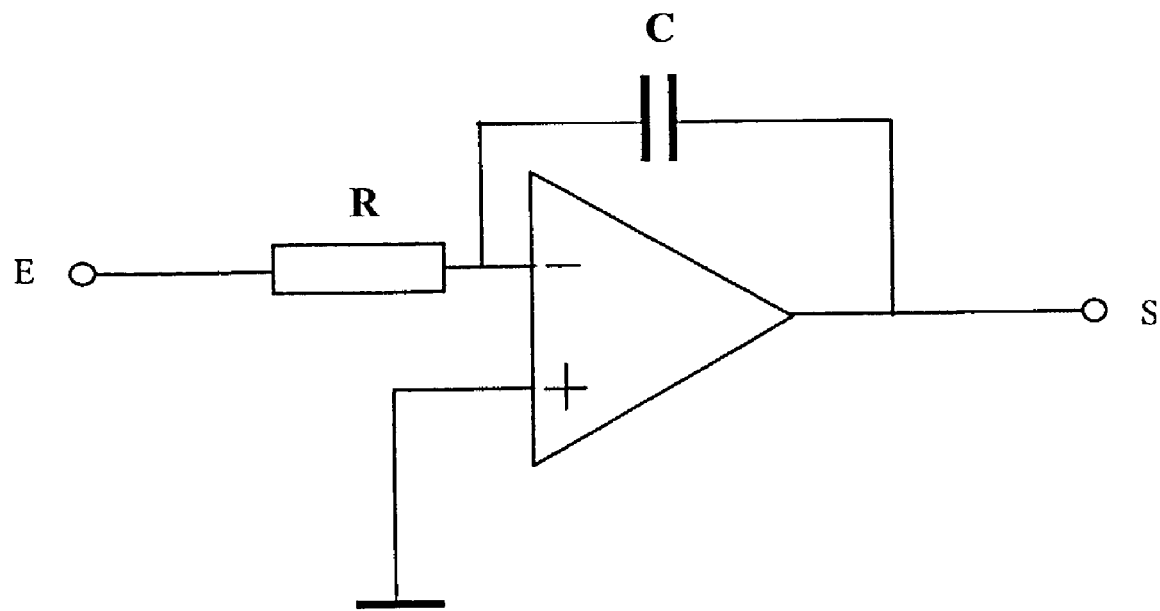
FIG. 19 illustrates embodiment of an integrator by means of an operational amplifier.

The scheme of FIG. 19 illustrates an integrator embodied by means of an operational amplifier, where E indicates the input to and S the output from the integrator.

Distributors and Combiners

The distributors and combiners can be embodied by means of the following techniques:
With coils and capacitors, for example by means of Wilkinson type networks.
Resistive, for example by means of star or delta networks.
By means of directional couplers.

Figure 20:
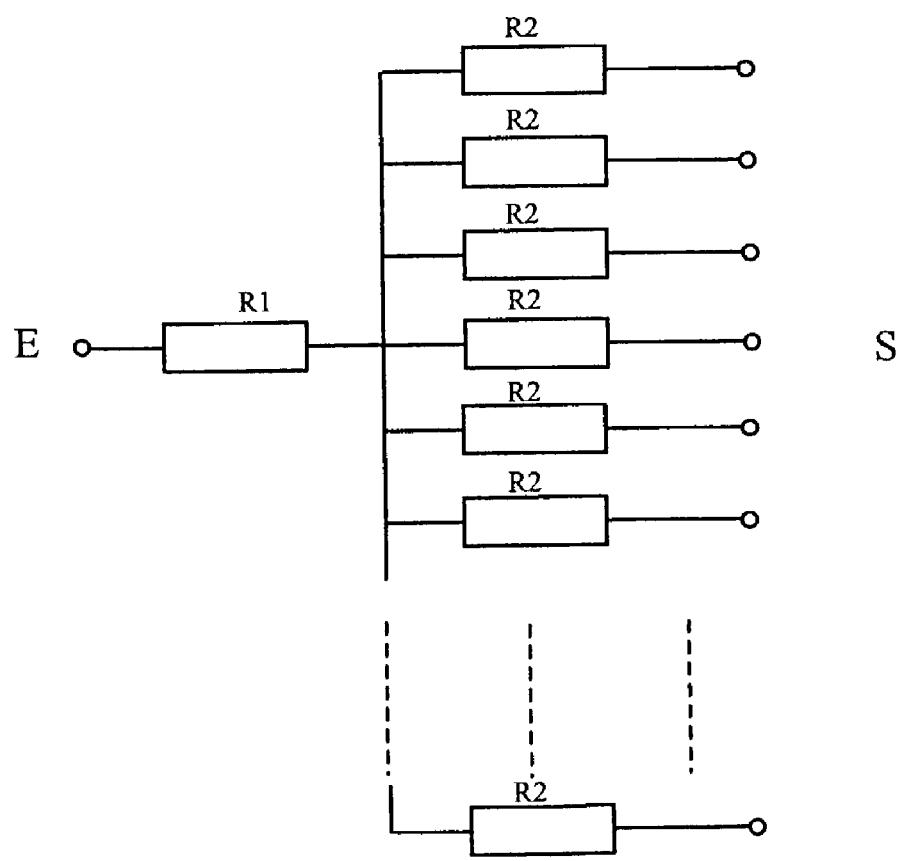
FIG. 20 illustrates a scheme of a resistive distributor by means of a star network.

An example of a resistive distributor embodied by means of a star resistor network is shown in FIG. 20, where E also indicates the input to and S the output from the distributor.

Signal Amplifiers

The signal amplifiers can be embodied by means of the following techniques:
Operational amplifiers with sufficient bandwidth.
Integrated monolithic amplifiers.
Directly by means of discret circuits based on transistors, following the traditional radio frequency amplifier design techniques.

Adder

The adder adds the signals obtained at the output of each of the multipliers M2 of the cells.

Example of Digital Embodiment
Introduction

Figure 21:
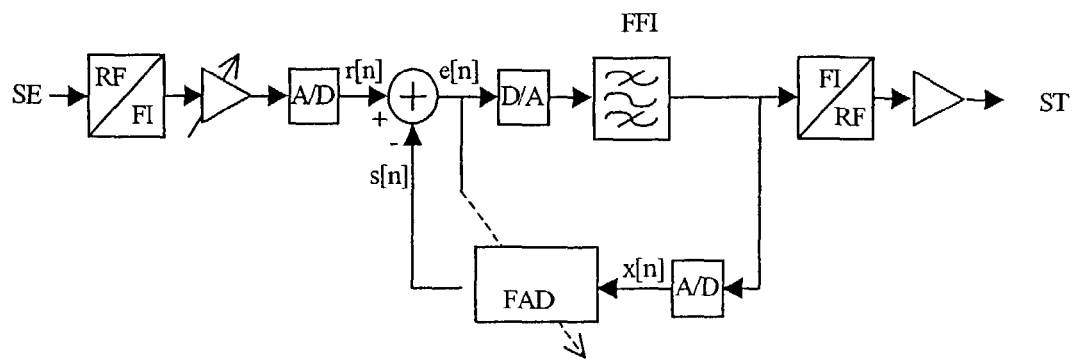
FIG. 21 illustrates a block diagram of a repeater according to the invention with a digital embodiment of the adaptive filter.

FIG. 21 shows the block diagram of the transmitter, also for DVB signals, in which the adaptive filter is implemented digitally. In a similar way to the analog case, the RF input signal SE is converted into intermediate frequency (FI), where a FI filter FFI rejects the possible out-of-band signals, to finally convert it again to RF. In the digital embodiment, the corresponding A/D and D/A conversions are required, as illustrated in FIG. 21.

The transmitter operates as follows: from the signal r[n] received by the antenna (which in fact is formed by the desired signal plus the echoes caused by the transmitting antenna) there is subtracted an estimate s[n] of the undesired signals obtained by the adaptive filter FAD, which gives an error signal e[n] that is fed through the FI filter FFI and is reconverted to RF.

Figure 22:
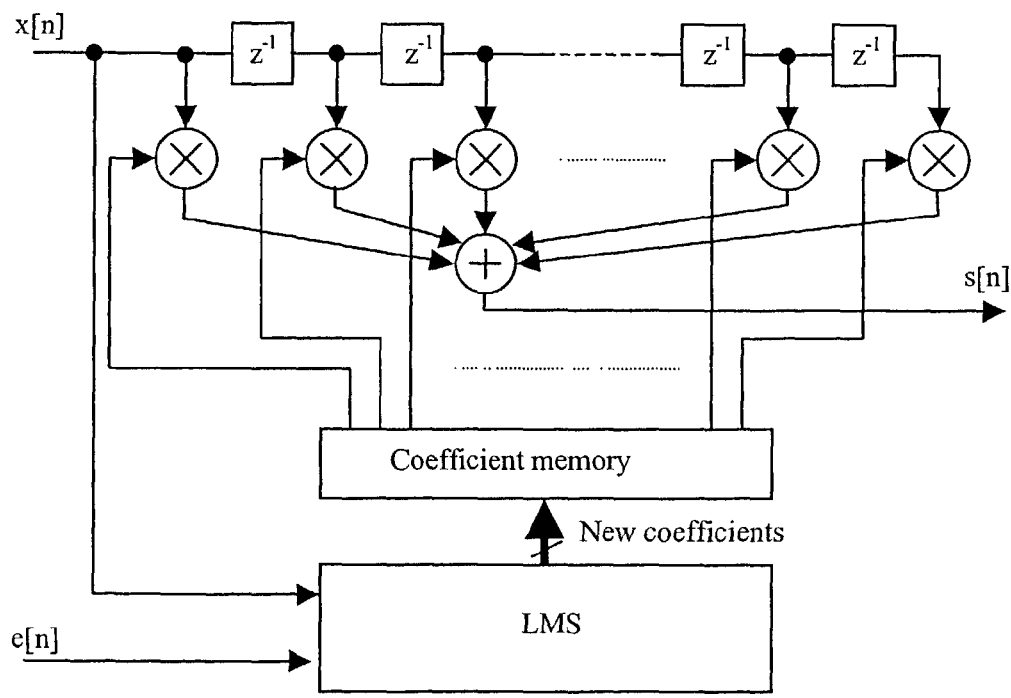
FIG. 22 illustrates the structure of the digital embodiment of the adaptive filter.

The structure of the digitally embodied adaptive filter is shown in FIG. 22. Essentially it is a variable coefficient FIR-filter, where these are updated periodically by the LMS algorithm.

For the instant n, the LMS algorithm calculates the new coefficients as follows:

$$h[n]=h[n-1]+\mu \cdot e[n] \cdot x[n]$$

Figure 23:
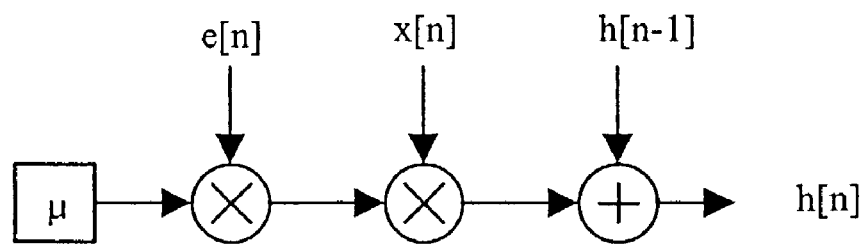
FIG. 23 illustrates the calculation of the coefficients of the adaptive filter.

This operation, schematically illustrated in FIG. 23, is carried out for each of the filter coefficients.

The constant $\mu$ has the function of adjusting the adaptation step. The greater its value, the quicker will be the convergence of the algorithm; in exchange, the coefficients will have a greater oscillation around the optimum solution. There is, therefore, a compromise between convergence speed and stability of the coefficients around the optimum solution.

Digital Embodiment

In FI we have the DVB pass band signal, with a bandwidth of 7.61MHz, which is digitized by means of a 12-bit A/D conversion. The subsequent processing is based on programmable logic digital integrated circuits of the FPGA (Field Programmable Gate Array) type.

Figure 24:
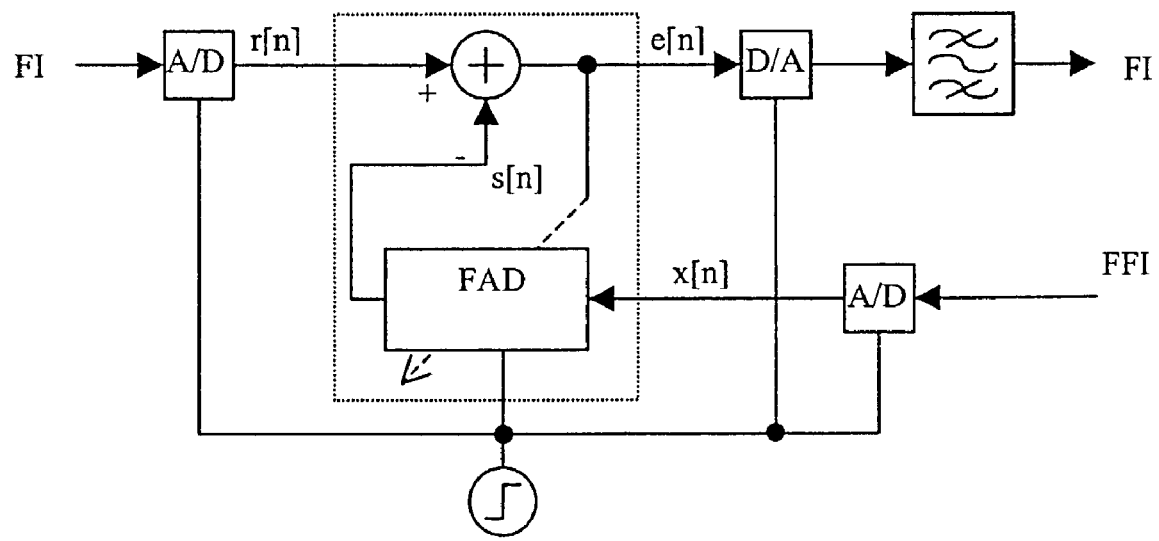
FIG. 24 illustrates analog-digital conversions for the adaptive filter.

FIG. 24 shows more particularly the blocks required to be able to embody the analog/digital interface.

Figure 25:
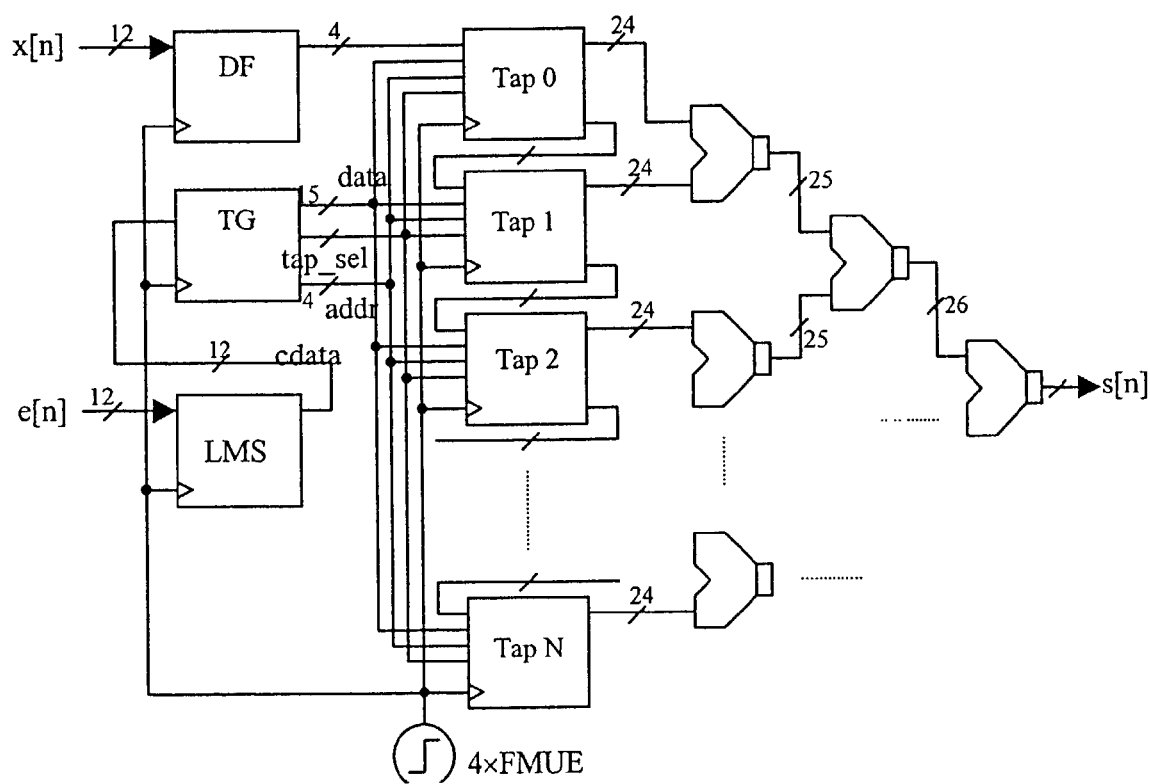
FIG. 25 illustrates the detailed structure of the adaptive filter.

A more detailed structure of the adaptive filter is as shown in FIG. 25. It is seen to be formed by the following parts:

Data-Framer DF: Its function is to fragment the input data x[n] (12 bits) into four parts, giving 3 bits to which a control bit is added. Because four cycles will be needed to process each sample, the clock frequency of the system should be four times the sampling frequency.

Table Generator TG: calculates the partial products of each coefficient and loads them in the LUT (Look-Up Table) of the corresponding tap.

LMS Algorithm: This calculates the new coefficients depending on the error signal e[n] and on x[n], and supplies them to the Table Generator TG, through cdata.

Tap Filter coefficients: Each Tap has assigned its own coefficient, and multiplies it by the input data.

Adder tree: this is a registered adder tree that obtains the sum of all the partial results supplied by the coefficients.

Figure 26:
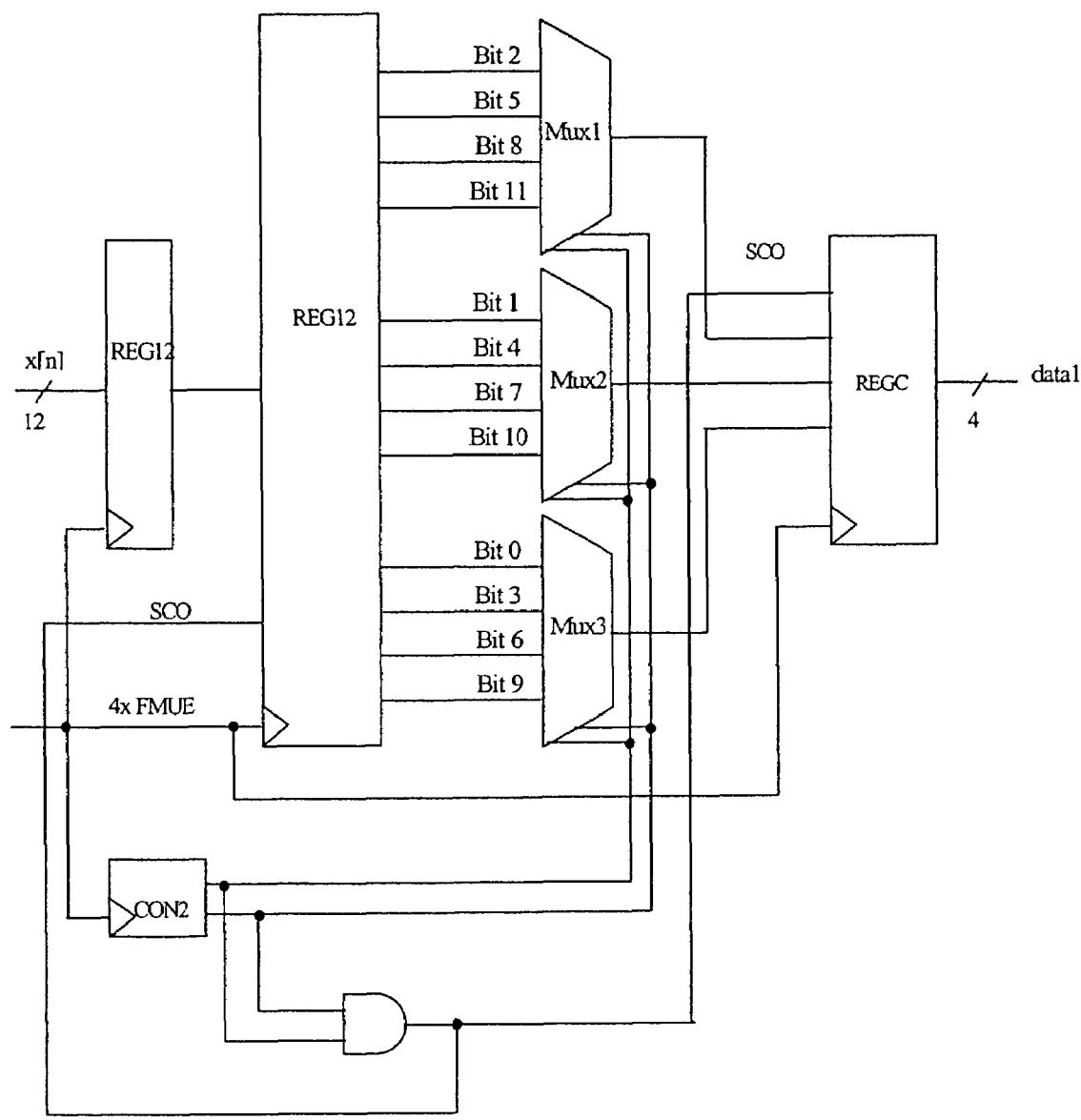
FIG. 26 illustrates a diagram of the Data-Framer.

Each of the parts comprising the system will be shown in greater detail below. Thus, FIG. 26 is the diagram of the Data-Framer DF. The 12 bit data (x[n]) are fed to a register REG12 at the sampling frequency FMUE, and are output, through a control register REGC fragmented into 4 parts of 4 bits each (each of these parts is known as an octet), at a frequency 4×FMUE 4 times higher than the sampling frequency FMUE. The three least significant bits of each octet correspond to three bits of the input data; the most significant bit is the control bit, and is set to 1 only when the fourth and last octet of the data being processed is output. This is achieved by means of a 2-bit counter CON2 and the three multiplexors Mux1, Mux2 and Mux3. Initially the counter CON2 is set to 0, therefore the multiplexors Mux1, Mux2 and Mux3 select the signal at their 0 input, that is, Mux1 selects bit 2, Mux2 bit 1 and Mux3 bit 0, that is to say, the three least significant bits of the sample. The control signal SCO is the most significant bit in the octet, and in this case is 0. Subsequently the counter is set to 1, and bits 5, 4 and 3 (the following three least significant bits) are selected and the control signal continues to be 0. Subsequently, when the counter is set to 2, bits 8, 7 and 6 are selected, with the control signal still being 0. Finally the counter is set to 3, bits 11, 10 and 9 (the most significant in the sample) are selected, and the control signal SCO is activated. In the following iteration the counter will be reset to 0 and there will be a new sample stored in the register REG12, the cycle beginning again.

Figure 28:
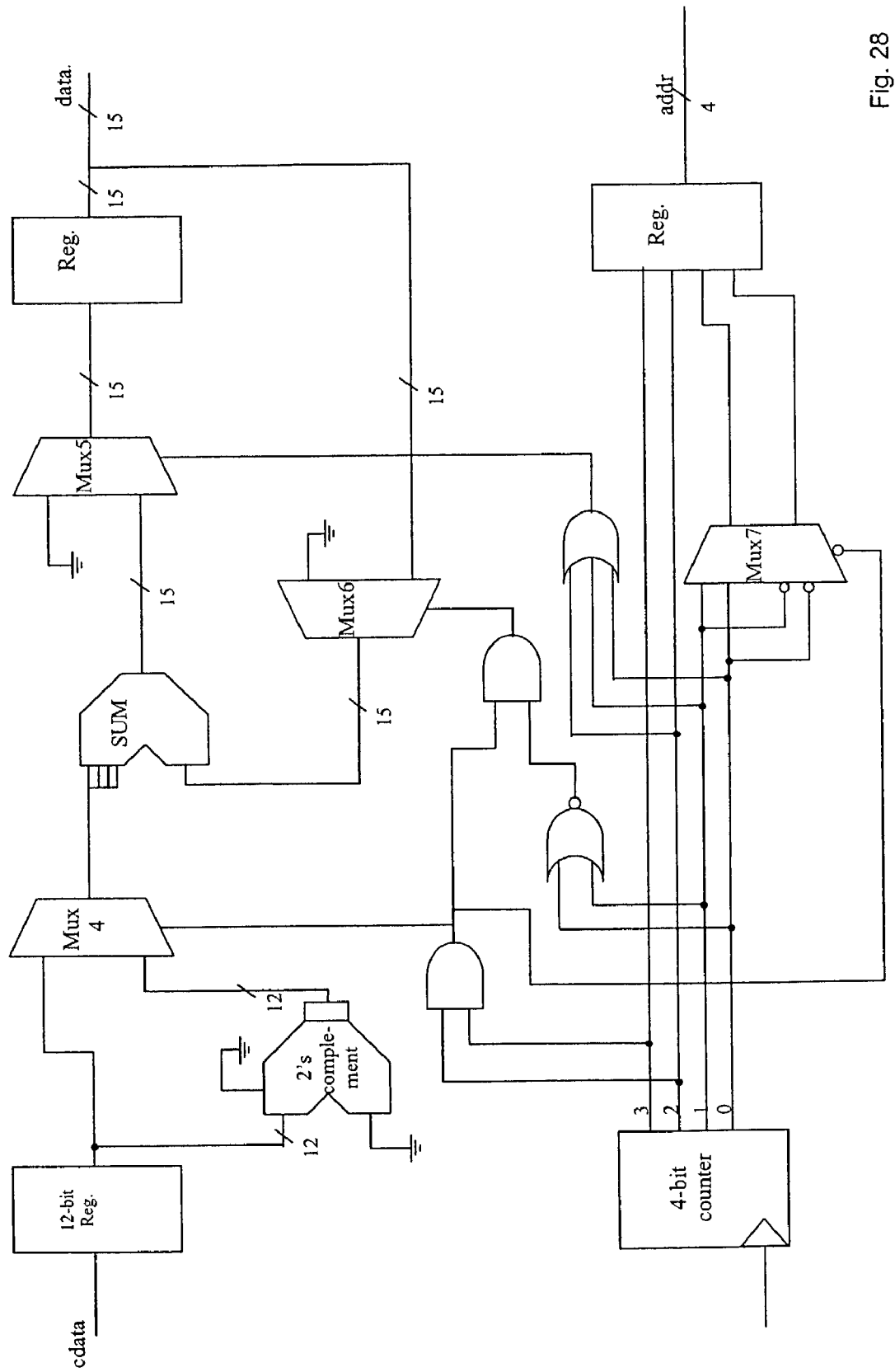
FIG. 28 illustrates the Table Generator.

FIG. 28 is an illustration of the diagram corresponding to the Table Generator TG. This calculates the partial products of each coefficient according to Table 1.

It could have been implemented simply with a 12*3 bit multiplier plus some minor components, but the configuration shown has been opted for, since is better as far as space occupation is concerned. The operation thereof is rather complex, although it is known to one skilled in the art, whereby only the idea will be described here: if Table 1 is observed, it will be seen that an accumulator is ideal for calculating the value of the memory positions $0_h$ to $7_h$, it is only necessary to add the coefficient to the last result obtained to get the current value. The same may be said of the positions $8_h$ to $B_h$ and of $C_h$ to $F_h$, only in the last named it is necessary to complement the coefficient. The counter is used to access the consecutive memory positions of the LUT. The function of Mux5 is to supply either 0 or the adder output to the output register. The control signal of Mux5 is the OR of the 3 least significant bits of the counter. Therewith 0 is selected for the memory positions 0 and 8 (as shown in Table 1). On the other hand, the adder is fed back through its own output, thereby obtaining the results for the addresses 1 to 7 and 9 to 11. The addresses 12 to 15 require negative results, to this end the two's complement of the coefficient is selected by means of Mux4. Finally, 0 is selected for the addresses 12 to 15 by means of Mux6, since from now on the results become negative.

Figure 27:
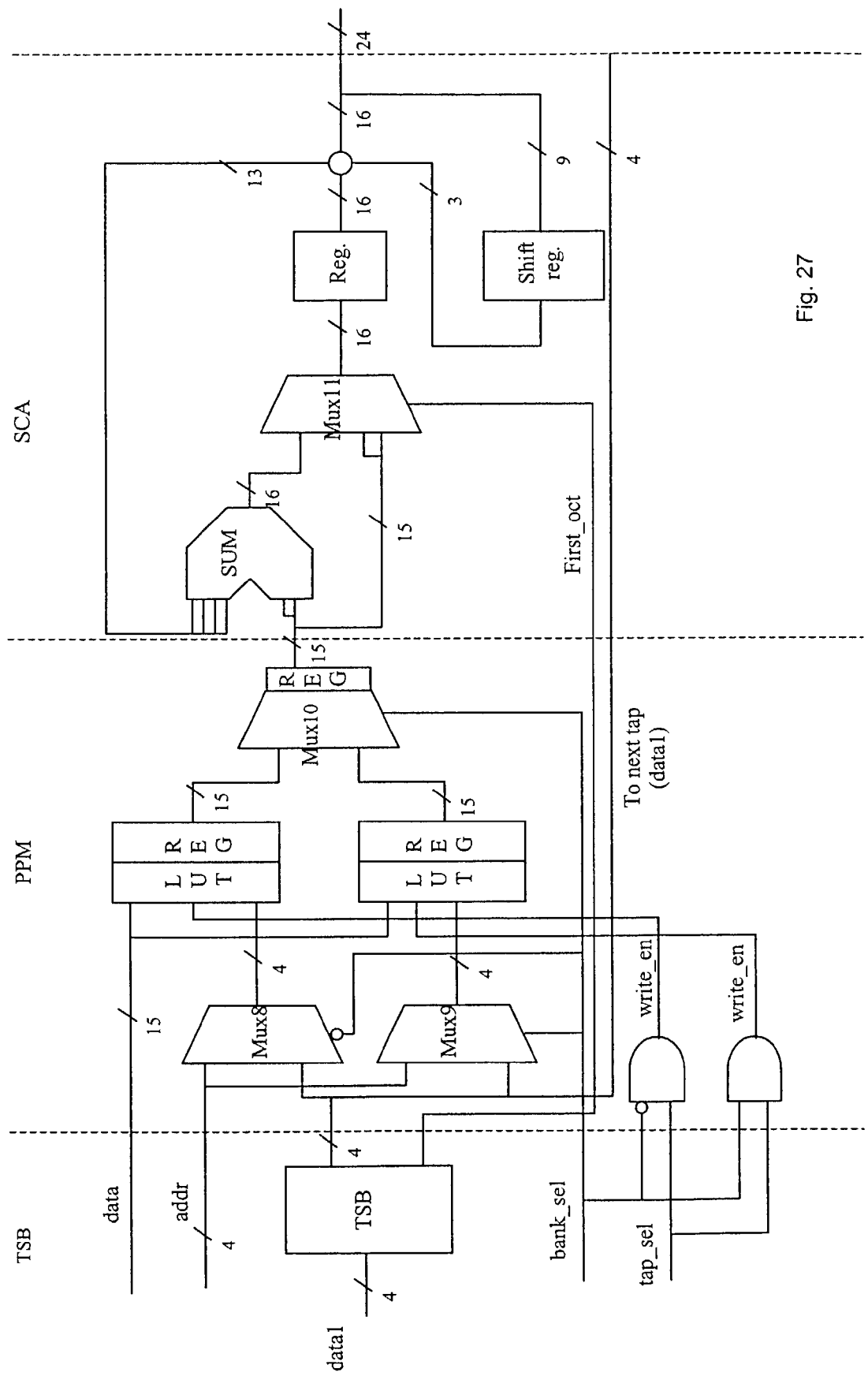
FIG. 27 illustrates the structure of each of the filter coefficients (tap).

FIG. 27 shows the structure for each tap comprising the filter. It consists of three clearly differentiated parts:

Time Skew Buffer TSB: this is a 4×4 bit shift register, thus the TSB is able to house a complete sample (divided into 4 parts of 4 bits each). At each clock cycle it delivers an octet to the Partial Product Multiplier PPM and also to the following tap. From the TSB there is also output the First_oct signal that is only activated when the least significant octet of the four forming the sample is being output. The Time Skew Buffer TSB receives the information datal coming from the control register REGC.

Partial Product Multiplier PPM: this consists of two RAM (called LUT: Look-Up-Table) that store the partial products of the coefficient according to Table 1. At the same time as one LUT is accessed to read the partial result of the multiplication, the Table Generator TG is writing the partial products corresponding to the new coefficient that the LMS algorithm will have calculated to the other LUT, by means of the data buses and addr. The multiplexors Mux8 and Mux9 are controlled by means of the bank_sel signal and are complementary, that is to say, when one selects its 0 input, the other selects its 1 input, and vice versa. This allows the addr and data signals to be addressed to the LUT corresponding thereto. The multiplexor Mux10, also controlled by the bank_sel signal, selects the data outputted by the LUT containing the partial products of the current coefficient (it should remember that meanwhile the other LUT is being updated with the partial products of the new coefficients). By means of the two AND gates and the bank_sel and tap_sel signals both write_en signals that enable the writing to the corresponding LUT are being generated.

Scaling Accumulator SCA: Its mission is to accumulate the partial results of each octet properly to obtain the complete solution of the multiplication (24 bits in all) at its output. It will be seen that it is an adder fed back by its own output, suitably escalated (the 13 most significant bits are fed back and the most significant bit is replicated three times). Mux11, which is controlled by means of the first_oct signal, allows the first octet to pass directly to the output; the other three octets forming the sample pass through the adder.

Obviously all the steps and elements described above are schematic, to facilitate the understanding of the invention. Details have not been included that are evident to one skilled in the art (additional filtering steps, etc.), and which, moreover, do not affect the concept of the invention. Thus, for example, the steps of filtering the process signal, of amplification of the process signal, of automatic gain control, etc. are frequently not done at one same time, but rather they are done in diverse steps. It should be understood, therefore, that where the existence of a step, for example, of filtering, is mentioned, it should not be understood that only one filtering step exists, but rather the signal in question is filtered, independently of the number of steps in which said filtering is carried out.

Also, the order indicated in the steps of the process is purely a descriptive order and does not have to coincide with the true order of the process. The only intention is to say that the process comprises said steps, that is to say, that it includes them, but it is not indicating that the sequence of performance of the steps is the one indicated. In fact, for example, the filtering, amplification and automatic gain control steps of the process signal that, as has already been indicated previously, are usually carried out in several stages, do not always follow the order indicated in the text, it is even frequent that the different stages of a step are interlaced with the stages of the other steps. Therefore, it is desirable to insist on the fact that the steps mentioned in the text and the claims only indicate the existence of said steps, without restricting the number of stages in which they are carried or the order in which they take place.

REFERENCES

[1] J. A. Anderson and E. Rosenfeld (Eds.), *Neurocomputing: Foundations of Research*, M.I.T. Press 1988
[2] R. T. Compton Jr., *Adaptive Antennas. Concepts and Performance*, PRENTICE-HALL 1988, ISBN: 0-13-004151-3.
[3] R. D. Gitlin, J. F. Hayes, S. B. Weinstein, *Data Communication Principles*, Plenum Press 1992.
[4] D. Harman, J. D. Wang, E J. J. Werner, *Frequency Offset Compensation Techniques for Echo-Cancellation Based Modems*, Conference Record Globecom '87, Tokyo, Japan.
[5] Youhong Lu and Joel M. Morris, "*Gabor Expansion for Adaptive Echo Cancellation*", IEEE Signal Processing Magazine, Vol.16, N°2 pag.68–80, March 1999, ISSN: 1053-5888.
[6] Odile Macchi, *Adaptive Processing. The Least Mean Squares Criterion with Applications in Transmission*, John Wiley & Sons 1995, ISBN: 0-471-93403-8
[7] Phillip A. Regalia. *Adaptive IIR Filtering in Signal Processing and Control* Marcel Dekker 1995. ISBN: 0-8247-9289-0.
[8] J. R. Rosenberger and J. Thomas, "*Performance of an Adaptive Echo Canceller Operating in a Noisy, Linear, Time-invariant Environment*", The Bell System Technical Journal, Vol.50 N°3 pag.785–813, March 1971
[9] John J. Shynk, "Adaptive IIR Filtering", *IEEE ASSP Magazine*, Vol.6 N°2 pag.4–21, April 1989, ISSN: 0740-7467
[10] John J. Shynk, "*Frequency-Domain and Multirate Adaptive Filtering*", IEEE Signal Processing Magazine, Vol.9, N°1 pag.14–37, January 1992, ISSN: 1053-5888
[11] B. M. Sondhi, "An Adaptive Echo Canceller", *The Bell System Technical Journal*, Vol.46 N°3 pag.497–511, March 1967
[12] John R. Treichler, C. Richard Johnson and Michael G. Larimore, *Theory and Design of Adaptive Filters*, Wiley & Sons 1987, ISBN: 0-471-83220-0

The invention claimed is:

1. A process for retransmitting single frequency signals, of the type used in a single frequency signal repeater and comprising the steps of: [a] receiving a first radio frequency signal through a receiving antenna, said first radio frequency signal having a receiving power, [b] converting said first radio frequency signal into a process signal, [c] filtering said process signal, [d] amplifying said process signal, [e] automatically controlling said process signal gain, [f] reconversion of said process signal into a second radio frequency signal, [g] amplifying the power of said second radio frequency signal, [h] output filtering said second radio frequency signal, [i] transmitting said second radio frequency signal through a transmitting antenna, where a coupling takes place between said transmitting antenna and said receiving antenna, and [j] a step of adaptive cancellation with an adaptive algorithm of said coupling between said transmitting antenna and said receiving antenna, said step of adaptive cancellation comprising a negative feedback of a feedback signal and said step of adaptive cancellation operating on digitized signals, wherein said step of adaptive cancellation takes, as input signal, said process signal digitized after said automatic gain control step, and wherein said adaptive algorithm follows a criterion of the group formed by the criterion of minimum mean squared error and the criterion of least squares.

2. The process according to claim 1, wherein it introduces an non-correlation delay in said process signal that establishes an non-correlation between said process signal and said feedback signal and wherein said non-correlation delay is introduced in said conversion step.

3. The process according to claim 1, wherein said feedback signal is negatively fed back to a signal of the group formed by said process signal before said automatic gain control step, said first radio frequency signal before said automatic gain control step, said process signal after said automatic gain control step, and said first radio frequency signal after said automatic gain control step.

4. The process according to claim 1, wherein said cancellation step time averages said process signal or said first radio frequency signal.

5. The process according to claim 1, wherein said cancellation step is implemented in a domain of the group formed by a time domain and a frequency-domain.

6. The process according to claim 1, where said adaptive algorithm follows a criterion of minimum mean squared error, wherein said adaptive algorithm is an adaptive algorithm of the group formed by a steepest descent adaptive algorithm, a differential steepest descent adaptive algorithm, a stochastic gradient adaptive algorithm, an LMS (Least Mean Squares) algorithm, an NLMS (Normalized Least Mean Squares) algorithm, an adaptive algorithm based on the sign function, a P vector adaptive algorithm, and a back propagation adaptive algorithm.

7. The process according to claim 1, where said adaptive algorithm follows a criterion of least squares, wherein said adaptive algorithm is a Kalman filter.

8. The process according to claim 1, wherein said adaptive algorithm is based on the methodology of Steiglitz-McBride or on the simplified hyperstable recursive adaptive filter (SHARF).

9. The process according to claim 1, wherein said cancellation step is broken down into at least one first sub-step and one second sub-step, where said first sub-step operates with said process signal and said second sub-stop operates with said process signal delayed in time.

10. The process according to claim 1, where said single frequency signal comprises training sequences, wherein said training sequences are taken as a reference signal at the time of calculating an error function that will govern said adaptive algorithm.

11. A single frequency signal repeater, of the type comprising: [a] a receiving antenna, for receiving a first radio frequency signal, with a receiving power, [b] a base unit {UB}, for converting said first radio frequency signal into a process signal, filtering said process signal, amplifying said process signal, automatically controlling said process signal gain, and reconverting said process signal into a second radio frequency signal, [c] a power amplifier unit (PA), [d] an output filter (FS), [e] a transmitting antenna, where said transmitting antenna and said receiving antenna may undergo coupling, and [f] an adaptive device with an adaptive algorithm for canceling said coupling between said transmitting antenna and said receiving antenna, said adaptive device comprising a negative feedback of a feedback signal and said adaptive device operating on digitized signals, wherein said adaptive device takes, as input signal, said process signal digitized after automatically controlling said process signal gain, and wherein said adaptive algorithm follows a criterion of the group formed by the criterion of minimum mean squared error, and the criterion of least squares.

12. A single frequency signal repeater, of the type comprising: [a] a receiving antenna, for receiving a first radio frequency signal, with a receiving power, [b] a base unit (UB), for filtering said first radio frequency signal, amplifying said first radio frequency signal, and automatically controlling said first radio frequency signal gain, [c] a power amplifier unit (PA), [d] an output filter (FS), [e] a transmitting antenna, where said transmitting antenna and said receiving antenna may undergo coupling, and [f] an adaptive device with an adaptive algorithm for canceling said coupling between said transmitting antenna and said receiving antenna, said adaptive device comprising a negative feedback of a feedback signal, said adaptive device operating on digitized signals and said adaptive device having as output signal a second radio frequency signal, wherein said adaptive device takes, as input signal, said first radio frequency signal digitized after automatically controlling said process signal gain, wherein said device comprises an adaptive filter (FAD) that follows said adaptive algorithm and wherein said adaptive filter (FAD) is broken down into at least a first block (FAD I) and a second block (FAD II), where said first block (FAD I) operates with said first radio frequency signal and said second block (FAD II) operates with said first radio frequency signal delayed in time.

13. The repeater according to claim 11, wherein said feedback signal is negatively fed back to a signal of the group formed by said process signal before said automatic gain control, said first radio frequency signal before said automatic gain control, said process signal after said automatic gain control, and said first radio frequency signal after said automatic gain control.

14. The repeater according to claim 11, wherein said device time averages said process signal or said first radio frequency signal.

15. The repeater according to claim 11, wherein said device is implemented in a domain of the group formed by the time domain and the frequency-domain.

16. The repeater according to claim 11, wherein said device comprises an adaptive filter (FAD) that follows said adaptive algorithm and wherein said adaptive filter (FAD) is implemented by means of an in-line delay architecture or by means of a lattice network.

17. The repeater according to claim 11, wherein said device comprises an adaptive filter (FAD) that follows said adaptive algorithm and wherein said adaptive filter (FAD) has a finite impulse response (FIR filter) or an infinite impulse response duration (IIR-filter).

18. The repeater according to claim 11, where said adaptive algorithm follows the criterion of minimum mean squared error, wherein said adaptive algorithm is an adaptive algorithm of the group formed by a steepest descent adaptive algorithm, a different steepest decent adaptive algorithm, a stochastic gradient adaptive algorithm, an LMS (Least Mean Squares) algorithm, an NLMS (Normalized Least Mean Squares) algorithm, an adaptive algorithm based on the sign function, a P vector adaptive algorithm, and a back propagation adaptive algorithm.

19. The repeater according to claim 11, where said adaptive algorithm follows a criterion of least squares, wherein said adaptive algorithm is a Kalman filter.

20. The repeater according to claim 11, wherein said adaptive algorithm said adaptive algorithm is based on the methodology of Steiglitz-McBride or on the simplified hyperstable recursive adaptive filter (SHARF).

21. A single frequency repeater, of the type comprising: [a] a receiving antenna, for receiving a first radio frequency signal, with a receiving power, [b] a base unit {UB}, for converting said first radio frequency signal into a process signal, filtering said process signal, amplifying said process signal, automatically controlling said process signal gain, and reconverting said process signal into a second radio frequency signal, [c] a power amplifier (PA), [d] an output filter (FS), [e] a transmitting antenna, where said transmitting antenna and said receiving antenna may undergo coupling, and [f] an adaptive device with an adaptive algorithm for canceling said coupling between said transmitting antenna and said receiving antenna, said adaptive device comprising a negative feedback of a feedback signal and said adaptive device operating on digitized signals, wherein said adaptive device takes, as input signal, said process signal digitized after automatically controlling said process signal gain, where said single frequency signal comprises training sequences, and wherein said training sequences are taken as a reference signal at the time of calculating an error function that will govern said adaptive algorithm.

22. A single frequency repeater, of the type comprising: [a] a receiving antenna, for receiving a first radio frequency signal, with a receiving power, [b] a base unit {UB}, for converting said first radio frequency signal into a process signal, filtering said process signal, amplifying said process signal, automatically controlling said process signal gain, and reconverting said process signal into a second radio frequency signal, [c] a power amplifier unit (PA), [d] an output filter (FS), [e] a transmitting antenna, where said transmitting antenna and said receiving antenna may undergo coupling, and [f] an adaptive device with an adaptive algorithm for canceling said coupling between said transmitting antenna and said receiving antenna, said adaptive device comprising a negative feedback of a feedback signal and said adaptive device operating on digitized signals, wherein said adaptive divice takes, as input signals, said process signal digitized after automatically controlling said process signal gain, and wherein said device comprises an adaptive filter (FAD) that follows said adaptive algorithm and wherein said adaptive filter (FAD) is broken down into at least a first block (FAD I) and a second block (FAD II), where said first block (FAD I) operates with said process signal and said second block (FAD II) operates with said process signal delayed in time.

* * * * *